United States Patent
Schwindeman et al.

(10) Patent No.: US 6,197,891 B1
(45) Date of Patent: *Mar. 6, 2001

(54) FUNCTIONALIZED CHAIN EXTENDED INITIATORS FOR ANIONIC POLYMERIZATION

(75) Inventors: James Anthony Schwindeman, Lincolnton; Eric John Granger, Charlotte; Robert Charles Morrison; Conrad William Kamienski, both of Gastonia; Robert James Letchford, Cherryville, all of NC (US)

(73) Assignee: FMC Corporation, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/717,233

(22) Filed: Sep. 26, 1996

Related U.S. Application Data

(63) Continuation-in-part of application No. 08/631,524, filed on Apr. 12, 1996, now Pat. No. 5,708,093, which is a continuation-in-part of application No. 08/436,780, filed on May 8, 1995, now Pat. No. 5,565,526, which is a continuation-in-part of application No. 08/242,518, filed on May 13, 1994, now abandoned.

(51) Int. Cl.$^7$ .............................. C08F 36/04; C08F 4/46; C08F 297/04

(52) U.S. Cl. ...................... 525/332.9; 525/113; 525/122; 525/123; 525/124; 525/126; 525/177; 525/184; 525/272; 525/279; 525/291; 525/292; 525/296; 525/298; 525/303; 525/309; 525/332.1; 525/332.2; 525/332.3; 525/333.3; 525/338; 525/340; 525/342; 525/353; 525/366; 525/371; 525/379; 525/383; 525/384; 525/385; 525/386

(58) Field of Search .............................. 525/272, 332.9, 525/332.1, 332.2, 332.3, 333.3, 338, 353, 113, 122, 123, 124, 126, 177, 184, 298, 303, 309, 383, 279, 291, 292, 296, 340, 342, 366, 371, 379, 384, 385, 386; 526/173, 178, 181

(56) References Cited

U.S. PATENT DOCUMENTS

| | | |
|---|---|---|
| 3,280,084 | 10/1966 | Zelinski et al. . |
| 3,326,881 | 6/1967 | Uraneck et al. . |
| 3,629,172 | 12/1971 | Jones . |
| 3,639,517 | 2/1972 | Kitchen et al. . |
| 3,719,730 | 3/1973 | Hansley et al. . |
| 3,776,964 | 12/1973 | Morrison et al. . |
| 3,842,146 | 10/1974 | Milkovich et al. . |
| 3,862,100 | 1/1975 | Halasa et al. . |
| 3,954,894 | 5/1976 | Kamienski et al. . |
| 3,956,232 | 5/1976 | Uraneck et al. . |
| 3,985,830 | 10/1976 | Fetters et al. . |
| 3,994,868 | * 11/1976 | Inomata et al. ........................ 525/339 |
| 4,039,593 | 8/1977 | Kamienski et al. . |
| 4,052,370 | 10/1977 | Halasa et al. . |
| 4,753,991 | 6/1988 | Bronstert . |
| 4,994,526 | 2/1991 | Peters . |
| 5,166,277 | 11/1992 | Goodwin et al. . |
| 5,310,490 | 5/1994 | Struglinski et al. . |
| 5,310,814 | 5/1994 | Struglinski et al. . |
| 5,321,148 | 6/1994 | Schwindeman . |
| 5,331,058 | 7/1994 | Shepherd et al. . |
| 5,336,726 | 8/1994 | DuBois . |
| 5,362,699 | 11/1994 | Shepherd et al. . |

(List continued on next page.)

FOREIGN PATENT DOCUMENTS

| | | |
|---|---|---|
| 0 189 672 | 8/1986 | (EP) . |
| 0 593 049 | 4/1994 | (EP) . |
| 0 632 075 | 1/1995 | (EP) . |
| 2 118 952 | 11/1983 | (GB) . |
| 2 241 317 | 8/1991 | (GB) . |
| 2 270 317 | 3/1994 | (GB) . |
| WO 95/22566 | of 0000 | (WO) . |
| WO 91/12277 | 8/1991 | (WO) . |
| WO 93/04094 | 3/1993 | (WO) . |

OTHER PUBLICATIONS

D.N. Schulz et al., J. Poly. Sci. Polymer Chem. Ed. 12, 153–166 (1974).
M. Gardette et al., Tetrahedron 41, 5887–5899 (1985).
J. Almena, Tetrahedron 51, 11883–11890 (1995).
A.J. Dias et al., Rubber & Plastics News, pp. 18–20 (Oct. 31, 1988).
A.J. Dias et al., *Macromolecules* 20, 2068–2076 (1987).
L. Weber, "Functionalization of Living Polymers—Results and Problems," Makromol. Chem., Macromol. Symp. 3, 317–329 (1986).

Primary Examiner—Fred Teskin
(74) Attorney, Agent, or Firm—Alston & Bird LLP

(57) ABSTRACT

A process for the preparation of hydrocarbon solutions of monofunctional ether initiators of the following general structure:

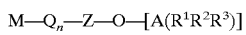

wherein M is an alkali metal selected from the group consisting of lithium, sodium and potassium; Q is a saturated or unsaturated hydrocarbyl group derived by incorporation of a compound selected from the group consisting of conjugated diene hydrocarbons, alkenylsubstituted aromatic hydrocarbons, and mixtures thereof into the M—Z linkage; Z is a branched or straight chain hydrocarbon group which contains 3–25 carbon atoms, optionally containing aryl or substituted aryl groups; A is an element selected from carbon and silicon; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and n is an integer from 1 to 5, monofunctional ethers produced by the process, use of the initiators in a polymerization process and polymers produced by the polymerization process.

161 Claims, No Drawings

U.S. PATENT DOCUMENTS

| | | |
|---|---|---|
| 5,376,745 | 12/1994 | Handlin, Jr. et al. . |
| 5,391,663 | 2/1995 | Bening et al. . |
| 5,393,843 | 2/1995 | Handlin, Jr. et al. . |
| 5,405,911 | 4/1995 | Handlin, Jr. et al. . |
| 5,416,168 | 5/1995 | Willis et al. . |
| 5,478,899 | 12/1995 | Bening . |
| 5,486,568 | 1/1996 | Bening et al. . |
| 5,502,131 | 3/1996 | Antkowiak et al. . |
| 5,521,255 | 5/1996 | Roy . |
| 5,565,526 | 10/1996 | Schwindeman et al. . |
| 5,567,774 | 10/1996 | Schwindeman et al. . |
| 5,708,092 * | 1/1998 | Schwindeman et al. ........ 526/181 X |

* cited by examiner

FUNCTIONALIZED CHAIN EXTENDED INITIATORS FOR ANIONIC POLYMERIZATION

CROSS-REFERENCE TO RELATED APPLICATIONS

This application is a continuation-in part of application Ser. No. 08/631,524, filed Apr. 12, 1996, now U.S. Pat. No. 5,708,093, which is a continuation-in-part of application Ser. No. 08/436,780, filed May 8, 1995, now U.S. Pat. No. 5,565,526, which is a continuation-in-part of application Ser. No. 08/242,518, filed May 13, 1994, now abandoned.

FIELD OF THE INVENTION

This invention concerns a process for the polymerization of olefinic-containing monomers, polymers produced by this process, novel anionic initiators for use in the polymerization process and a process for making the anionic initiators.

BACKGROUND OF THE INVENTION

Useful polymeric products are obtained by polymerizing olefinic containing monomers in the presence of an organoalkali metal initiator and subsequently reacting the resulting polymer, containing an active alkali metal end group or groups, with a reagent which will couple the polymer molecules or replace the alkali metal with more stable reactive end groups.

Monofunctional silyl ether initiators, containing alkali metal end groups useful in effecting such polymerization reactions are disclosed in Great Britain published patent application 2,241,239, published Aug. 28, 1991. These monofunctional silyl ether initiators were demonstrated to be useful in producing polybutadienes having desirable characteristics such as a molecular weight of typically 1,000 to 10,000, 1–4 content of typically 90%, etc.

A co-pending U.S. application Ser. No. 198,914, filed Feb. 18, 1994, discloses a process for the preparation of hydrocarbon solutions of monofunctional ether initiators of the following general structure:

$$M—Z—O—C—(R^1R^2R^3) \qquad (I)$$

wherein M is defined as an alkali metal, preferably lithium; Z is a branched or straight chain hydrocarbon group which contains 3–25 carbon atoms, optionally containing aryl or substituted aryl groups; and $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and their employment as initiators in the anionic polymerization of olefin containing monomers in an inert, hydrocarbon solvent optionally containing a Lewis base. The process reacts selected omega-protected-1-haloalkyls whose alkyl groups contain 3 to 25 carbon atoms, with lithium metal at a temperature between about 35° C. and about 130° C., preferably at the reflux temperature of an alkane or cycloalkane reaction solvent containing 5 to 10 carbon atoms and mixtures of such solvents.

Anionic polymerizations employing the monofunctional ether initiators are conducted in an inert solvent, preferably a non-polar solvent, optionally containing an ethereal modifier, using an olefinic monomer which is an alkenyl-substituted aromatic hydrocarbon or a 1,3-diene at a temperature of about −30° C. to about +150° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

The precursor omega-protected-1-haloalkanes (halides) were prepared from the corresponding haloalcohol by the standard literature methods. For example, 3-(1,1-dimethylethoxy)-1-chloropropane was synthesized by the reaction of 3-chloro-1-propanol with 2-methylpropene according to the method of A. Alexakis, M. Gardette, and S. Colin, Tetrahedron Letters, 29, 1988, 2951. The method of B. Figadere, X. Franck and A. Cave, Tetrahedron Letters, 34, 1993, 5893, which involved the reaction of the appropriate alcohol with 2-methyl-2-butene catalyzed by boron trifluoride etherate was employed for the preparation of the t-amyl ethers. The alkoxy, alkylthio or dialkylamino substituted ethers, for example 6-[3-(methylthio)-1-propyloxy]-1-chlorohexane, were synthesized by reaction of the corresponding substituted alcohol, for instance 3-methylthio-1-propanol, with an alpha-bromo-omega-chloroalkane, for instance 1-bromo-6-chlorohexane, according to the method of J. Almena, F. Foubelo and M. Yus, Tetrahedron, 51, 1995, 11883. The compound 4-(methoxy)-1-chlorobutane, and the higher analogs, were synthesized by the ring opening reaction of tetrahydrofuran with thionyl chloride and methanol, according to the procedure of T. Ferrari and P. Vogel, SYNLETT, 1991, 233. The triphenylmethyl protected compounds, for example 3-(triphenylmethoxy)-1-chloropropane, are prepared by the reaction of the haloalcohol with triphenylmethylchloride, according to the method of S. K. Chaudhary and O. Hernandez, Tetrahedron Letters, 1979, 95.

Monofunctional ether initiators prepared in accord with this earlier process can include, but are not limited to, 3-(1,1-dimethylethoxy)-1-propyllithium, 3-(1,1-dimethylpropoxy)-1-propyllithium, 5-(1,1-dimethylethoxy)-1-pentyllithium, 3-(1,1-dimethylethoxy)-2,2-dimethyl-1-propyllithium, 4-(1,1-dimethylethoxy)-1-butyllithium, 6-(1,1-dimethylethoxy)-1-hexyllithium, 8-(1,1-dimethylethoxy)-1-octyllithium, 4-(ethoxy)-1-butyllithium, 4-(propyloxy)-1-butyllithium, 4-(1-methylethoxy)-1-butyllithium, 3-(triphenylmethoxy)-2,2-dimethyl-1-propyllithium, 4-(triphenylmethoxy)-1-butyllithium, 3-[3-(dimethylamino)-1-propyloxy]-1-propyllithium, 3-[2-(dimethylamino)-1-ethoxy]-1-propyllithium, 3-[2-(diethylamino)-1-ethoxy]-1-propyllithium, 3-[2-(diisopropyl)amino]-1-ethoxy]-1-propyllithium, 3-[2-(1-piperidino)-1-ethoxy]-1-propyllithium, 3-[2-(1-pyrrolidino)-1-ethoxy]-1-propyllithium, 4-[3-(dimethylamino)-1-propyloxy]-1-butyllithium, 6-[2-(1-piperidino)-1-ethoxy]-1-hexyllithium, 3-[2-(methoxy)-1-ethoxy]-1-propyllithium, 3-[2-(ethoxy)-1-ethoxy]-1-propyllithium, 4-[2-(methoxy)-1-ethoxy]-1-butyllithium, 5-[2-(ethoxy)-1-ethoxy]-1-pentyllithium, 3-[3-(methylthio)-1-propyloxy]-1-propyllithium, 3-[4-(methylthio)-1-butyloxy]-1-propyllithium, 3-(methylthiomethoxy)-1-propyllithium, 6-[3-(methylthio)-1-propyloxy]-1-hexyllithium, 3-[4-(methoxy)-benzyloxy]-1-propyllithium, 3-[4-(1,1-dimethylethoxy)-benzyloxy]-1-propyllithium, 3-[2,4-(dimethoxy)-benzyloxy]-1-propyllithium, 8-[4-(methoxy)-benzyloxy]-1-octyllithium, 4-[4-(methylthio)-benzyloxy]-1-butyllithium, 3-[4-(dimethylamino)-benzyloxy]-1-propyllithium, 6-[4-(dimethylamino)-benzyloxy]-1-hexyllithium, 5-(triphenylmethoxy)-1-pentyllithium, 6-(triphenylmethoxy)-1-hexyllithium, and 8-(triphenylmethoxy)-1-octyllithium. These monofunctional ether initiators have rather limited hydrocarbon solubility.

DETAILED DESCRIPTION OF THE INVENTION

The present process provides monofunctional ether initiators with increased hydrocarbon solubility, a process for the production of these monofunctional ether initiators, an anionic polymerization process for polymerizing olefin containing monomers employing these new initiators and polymers produced by the new anionic polymerization process.

The monofunctional ether initiators of this invention having increased solubility in hydrocarbons are of the formula:

$$M—Q_n—Z—O—[A(R^1R^2R^3)] \qquad (II)$$

wherein M is defined as an alkali metal selected from the group consisting of lithium, sodium, and potassium; Q is a hydrocarbyl group derived by the incorporation of one or more conjugated diene hydrocarbons, one or more alkenyl-substituted aromatic hydrocarbons containing 8–25 carbon atoms, or mixtures thereof, into the M—Z linkage; Z is a branched or straight chain hydrocarbon group which contains 3–25 carbon atoms, optionally containing aryl or substituted aryl groups; [A(R¹R²R³)] is a protecting group in which A is an element selected from Group IVa of the Periodic Table of Elements, exemplified by carbon and silicon; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms, and n is an integer from 0 to 5.

The process aspect of this invention for producing the initiators of formula (II) reacts selected omega-protected-1-haloalkanes wherein the connecting groups contain 3 to 25 carbon atoms, with an alkali metal, preferably lithium, at a temperature between about 35° C. and about 130° C., preferably at the solvent reflux temperature, to form a monofunctional lithium ether initiator (of formula I) which is then reacted with a compound selected from the group consisting of conjugated diene hydrocarbons, alkenylsubstituted aromatic hydrocarbons, and mixtures thereof, in an alkane or cycloalkane reaction solvent containing 5 to 10 carbon atoms and mixtures of such solvents to produce a monofunctional ether initiator with an extended chain or connecting group between the metal atom (M) and oxygen (O) in formula (II) above.

Incorporation of Q groups into the M—Z linkage to form the compounds of formula (II) above involves addition of compounds of the formula M—Z—O— (A—R¹R²R³), where the symbols have the meanings ascribed above, across the carbon to carbon double bonds in compounds selected from the group consisting of one or more conjugated diene hydrocarbons, one or more alkenylsubstituted aromatic hydrocarbons, or mixtures thereof, to produce new carbon-lithium bonds of an allylic or benzylic nature, much like those found in a propagating polyalkadiene or polyarylethylene polymer chain derived by anionic initiation of the polymerization of conjugated dienes or arylethylenes. These new carbon-lithium bonds are now "activated" toward polymerization and so are much more efficient in promoting polymerization than the precursor M—Z (M=Li) bonds themselves.

Conjugated diene hydrocarbons useful in practicing this invention include, but are not limited to, isoprene, 1,3-butadiene, piperylene (1,3-pentadiene), myrcene, 2,3-dimethyl-1,3-butadiene, 1,3-hexadiene, 2,4-hexadiene, 2,5-dimethyl-2,4-hexadiene and the like, as described in more detail below. Alkenylsubstituted aromatic hydrocarbons useful in practicing this invention include, but are not limited to, styrene, alpha-methylstyrene, 2-vinylpyridine, 4-vinylpyridine, vinyltoluene, 4-(tert-butyl)-styrene, 1-vinylnapthalene, 3-methylstyrene, 4-methylstyrene, 1,1-diphenylethylene, and the like, also as described in more detail below.

The alkali metal, preferably lithium, used in preparing the monofunctional ethers is used as a dispersion whose particle size usually does not exceed about 300 microns. Preferably the particle size is between 10 and 300 microns, although coarser particle size lithium can be used. The lithium metal can contain 0.2 to 0.8 and preferably 0.3 to 0.5 weight percent sodium. The lithium metal is used in amounts of 90% of theoretical to a 40% excess above the theoretical amount necessary to produce the monofunctional alkali metal ether initiators.

Useful omega-protected-1-haloalkyls which include, but are not limited to, 3-(1,1-dimethylethoxy)-1-propylhalide, 3-(1,1-dimethylpropoxy)-1-propylhalide, 4-(methoxy)-1-butylhalide, 3-(triphenylmethoxy)-1-propylhalide, 5-(triphenylmethoxy)-1-pentylhalide, 6-(triphenylmethoxy)-1-hexylhalide, 8-(triphenylmethoxy)-1-octylhalide 3-(1,1-dimethylethoxy)-2-methyl-1-propylhalide, 3-[3-(dimethylamino)-1-propyloxy]-1-propylhalide, 3-[2-(dimethylamino)-1-ethoxy]-1-propylhalide, 3-[2-(diethylamino)-1-ethoxy]-1-propylhalide, 3-[2-(diisopropyl)amino)-1-ethoxy]-1-propylhalide, 3-[2-(1-piperidino)-1-ethoxy]-1-propylhalide, 3-[2-(1-pyrrolidino)-1-ethoxy]-1-propylhalide, 4-[3-(dimethylamino)-1-propyloxy]-1-butylhalide, 6-[2-(1-piperidino)-1-ethoxy]-1-hexylhalide, 3-[2-(methoxy)-1-ethoxy]-1-propylhalide, 3-[2-(ethoxy)-1-ethoxy]-1-propylhalide, 4-[2-(methoxy)-1-ethoxy]-1-butylhalide, 5-[2-(ethoxy)-1-ethoxy]-1-pentylhalide, 3-[3-(methylthio)-1-propyloxy]-1-propylhalide, 3-[4-(methylthio)-1-butyloxy]-1-propylhalide, 3-(methylthiomethoxy)-1-propylhalide, 6-[3-(methylthio)-1-propyloxy]-1-hexylhalide, 3-[4-(methoxy)-benzyloxy]-1-propylhalide, 3-[4-(1,1-dimethylethoxy)-benzyloxy]-1-propylhalide, 3-[2,4-(dimethoxy)-benzyloxy]-1-propylhalide, 8-[4-(methoxy)-benzyloxy]-1-octylhalide, 4-[4-(methylthio)-benzyloxy]-1-butylhalide, 3-[4-(dimethylamino)-benzyloxy]-1-propylhalide, 6-[4-(dimethylamino)-benzyloxy]-1-hexylhalide, 3-(1,1-dimethylethoxy)-2,2-dimethyl-1-propylhalide, 6-(t-butyldimethylsilyloxy)-1-hexylhalide, 3-(t-butyldimethylsilyloxy)-2,2-dimethyl-1-propylhalide; 3-(t-butyldimethylsilyloxy)-1-propylhalide; 4-(t-butyldimethylsilyloxy)-1-butylhalide and 3-(trimethylsilyloxy)-2,2-dimethyl-1-propylhalide. The halo- or halide group preferably is selected from chlorine and bromine. The reaction temperature is above 50° C., the reaction medium is a hydrocarbon solvent and the reaction is conducted in an inert atmosphere.

The present invention also provides a process for the anionic polymerization of olefinic-containing monomers. Polymers can be prepared by initiating polymerization of a monomer selected from the group consisting of conjugated diene hydrocarbons and alkenylsubstituted aromatic hydrocarbons (singly, sequentially, or as mixtures thereof) in an inert (hydrocarbon) or mixed hydrocarbon-polar solvent medium at a temperature of −30° C. to 150° C. with an initiator having the formula:

$$M—Q_n—Z—O—[A(R^1R^2R^3)] \qquad (II)$$

wherein M is defined as an alkali metal selected from the group consisting of lithium, sodium and potassium; Q is an hydrocarbyl group produced by the incorporation of one or more conjugated diene hydrocarbons, one or more alkenyl-substituted aromatic hydrocarbons containing 8–25 carbon atoms, or mixtures thereof, into the M—Z linkage; Z is a branched or straight chain hydrocarbon group which contains 3–25 carbon atoms, optionally containing aryl or substituted aryl groups; $[A(R^1R^2R^3)]$ is a protecting group in which A is an element selected from Group IVa of the Periodic Table of Elements, exemplified by carbon and silicon; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms, and n is an integer from 0 to 5, to provide a mono-protected, mono-functionalized living polymer.

The olefinic monomer to be anionically polymerized is chosen from the group of unsaturated organic compounds that can be polymerized anionically (i.e. in a reaction initiated by an organo-alkali metal). Preferably the monomer is selected from the group consisting of conjugated diene hydrocarbons, alkenylsubstituted aromatic hydrocarbons, and mixtures thereof.

The conjugated diene hydrocarbons or alkenylsubstituted aromatic hydrocarbons may be polymerized singly, or in admixture with each other or with other dienes or alkenyl-substituted aromatic hydrocarbons to form random or tapered copolymers, or by charging the compounds to the reaction mixture sequentially, either with each other or with other dienes or alkenylsubstituted aromatic hydrocarbons, to form block copolymers.

Examples of suitable conjugated diene hydrocarbons include, but are not limited to, 1,3-butadiene, isoprene, 2,3-dimethyl-1,3-butadiene, 1,3-pentadiene (piperylene), myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, 2,4-hexadiene, 2,5-dimethyl-2,4-hexadiene, and mixtures thereof. Numerous other olefinic monomers are disclosed, for example, in U.S. Pat. No. 3,377,404.

Suitable alkenylsubstituted aromatic hydrocarbons include the optionally-substituted styrenes and vinylnaphthalenes. Polymerizable alkenylsubstituted aromatic compounds which can be anionically polymerized include, but are not limited to, styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphthalene, 1,2-diphenyl-4-methyl-1-hexene and mixtures of these, as well as alkyl, cycloalkyl, aryl, alkylaryl and arylalkyl derivatives thereof in which the total number of carbon atoms in the combined hydrocarbon constituents is generally not greater than 18. Examples of these latter compounds include 3-methylstyrene, 4-methylstyrene, 3,5-diethylstyrene, 4-tert-butylstyrene, 2-ethyl-4-benzylstyrene, 4-phenylstyrene, 4-p-tolylstyrene, 2,4-divinyltoluene, 4,5-dimethyl-1-vinylnaphthalene, and 1,1-diphenylethylene. U.S. Pat. No. 3,377,404, incorporated herein by reference in its entirety, discloses suitable additional alkenylsubstituted aromatic hydrocarbons.

Polymerization is followed by functionalization of the resultant living polymer with a suitable functionalizing compound, electrophile, linking or coupling agent, or other material as known in the art to be useful for terminating or end capping living polymers to provide a mono-protected, or di-protected, di-functional polymer. The mono-protected or di-protected, di-functional polymer is then recovered by standard techniques. Optionally the protecting group(s) are removed to provide a di-functional polymer.

The resultant linear or branched polymer can have one or more terminal functional groups and can be described generally by the formula $$FG—(P)_x—(Q)_n—Z—O—[A(R^1R^2R^3)] \qquad (III)$$

wherein FG is a functional group derived from reaction of the intermediate polymer with one of the selected functionalizing compounds; P is a saturated or unsaturated hydrocarbyl group derived by incorporation of a compound selected from the group consisting of conjugated diene hydrocarbons, alkenylsubstituted aromatic compounds, and mixtures thereof; Q, n, Z, A, $R^1$, $R^2$, and $R^3$ have the meanings ascribed above; and x is the number of units of conjugated diene, alkenylsubstituted aromatic hydrocarbon or mixture thereof, and may vary from 10 to 4000.

The functional polymer of Formula (III) can be further reacted with monofunctional monomers, such as caprolactam, or other lactams, to form a polyamide block polymer segment, or cyclic ethers such ethylene oxide to form polyether blocks; or with difunctional monomers, such as diacids or anhydrides and diamines to form polyamide blocks, or diacids or anhydrides and diols to form polyester blocks, or diols and polyols with diisocyanates or polyisocyanates to form polyurethane blocks. Polyisocyanates or polyfunctional polyols are examples of polyfunctional monomers. The functional group of Formula (III) may contain a reactive olefinic bond, such as a styrenic or acrylic functionality, which will act as a "macromonomer", capable of polymerizing with other free radically polymerizable monomers.

Alternatively, the functional polymer of Formula (III) can be reacted with monomer(s) as described above in the absence of a strong acid catalyst to yield block copolymers, while maintaining the integrity of the protective group to provide a functional block polymer. The protective group can then be removed and the other functional end polymerized with the same monomer(s) to form segmented block polymers having the same polymer segments of the same or different chain lengths, or with a different monomer(s) to form segmented block polymers having different polymer segments of the same or different chain lengths.

Still another alternative is to remove the protective group of the functional polymer of Formula (III) and to polymerize the same with monomer(s) or with a functional block polymer as described above to produce novel segmented block polymers.

The resultant novel segmented block polymers thus can have polymer segments having the same chain length derived from the same monomer or a mix of comonomers (symmetric segmented block polymers); polymer segments having different chain lengths derived from the same monomer or a mix of comonomers; or polymer segments having the same or different chain lengths derived from a different monomer or a mix of comonomers (sequential segmented block polymers). This illustrates an advantage of the present invention, namely, the flexibility to perform different chemistries at the functional sites of the polymers and thus to provide a wide variety of segmented block polymers. As used herein, the term "sequential" segmented block polymers refers to segmented block polymers having polymer segments of the same or different chain lengths derived from different monomers or comonomers, and/or polymer segments derived from similar monomers or comonomers but having different chain lengths.

Optionally, prior to or instead of copolymerization as described above, the functional group of the functionalized polymer of Formula (III) can be converted to a different functional group. For example, the living polymer can be reacted with ethylene oxide to provide an hydroxy functionality, and the hydroxyl group thereafter reacted with sulfonyl chloride in the presence of a tertiary amine catalyst to form a sulfonate functional group. The sulfonate functional group can then be reacted with a primary amine or ammonia under heat and pressure to form polymers with amine functionality at the terminus thereof. (Ref. Hinney and Baghdadchi, European Patent No. 206,714 (1986)).

The inert polymerization solvent is preferably a non-polar solvent such as a hydrocarbon, since anionic polymerization in the presence of such non-polar solvents is known to produce polyenes with high 1,4-contents from 1,3-dienes. Solvents useful in practicing this invention include, but are not limited to, inert liquid alkanes, cycloalkanes and aromatic solvents such as alkanes and cycloalkanes containing five to ten carbon atoms, such as pentane, hexane, cyclohexane, methylcyclohexane, heptane, methylcycloheptane, octane, decane and the like, and aromatic solvents containing six to ten carbon atoms such as toluene, ethylbenzene, p-xylene, m-xylene, o-xylene, n-propylbenzene, isopropylbenzene, n-butylbenzene, t-butylbenzene, and the like.

Polar solvents (modifiers) can be added to the polymerization reaction to alter the microstructure of the resulting polymer, i.e., increase the proportion of 1,2 (vinyl) microstructure or to promote functionalization or randomization. Examples of polar modifiers include, but are not limited to, diethyl ether, dibutyl ether, tetrahydrofuran, 2-methyltetrahydrofuran, methyl tert-butyl ether, diazabicyclo[2.2.2]octane, triethylamine, tributylamine, N,N,N',N'-tetramethylethylene diamine (TMEDA), 1,2-dimethoxyethane (glyme), alkali metal alkoxides, and amino-substituted alkali metal alkoxides. The amount of the polar modifier added depends on the vinyl content desired, the nature of the monomer, the temperature of the polymerization, and the identity of the polar modifier.

Compounds useful in functionalizing the polymeric living polymer include, but are not limited to, alkylene oxides, such as ethylene oxide, propylene oxide, styrene oxide, and oxetane; oxygen; sulfur; carbon dioxide; halogens such as chlorine, bromine and iodine; propargyl halides; haloalkyltrialkoxysilanes, alkenylhalosilanes, and omega-alkenylarylhalosilanes, such as styrenyldimethyl chlorosilane; sulfonated compounds, such as 1,3-propane sultone; amides, including cyclic amides, such as caprolactam, N-benzylidene trimethylsilylamide, and dimethyl formamide; silicon acetals; 1,5-diazabicyclo[3.1.0]hexane; allyl halides, such as allyl bromide and allyl chloride; methacryloyl chloride; amines, including primary, secondary, tertiary and cyclic amines, such as 3-(dimethylamino)-propyl chloride and N-(benzylidene)trimethylsilylamine; epihalohydrins, such as epichlorohydrin, epibromohydrin, and epiiodohydrin, and other materials as known in the art to be useful for terminating or end capping polymers. These and other useful functionalizing agents are described, for example, in U.S. Pat. Nos. 3,786,116 and 4,409,357, the entire disclosure of each of which is incorporated herein by reference. The polymer optionally can be hydrogenated after functionalization.

If desired, the protecting groups can be removed from the polymer. This deprotection can be performed either prior to or after the optional hydrogenation of the residual aliphatic unsaturation, as described in more detail below. For example, to remove tert-alkyl-protected groups, the protected polymer can be mixed with Amberlyst® 15 ion exchange resin and heated at an elevated temperature, for example 150° C., until deprotection is complete. In addition, tert-alkyl-protected groups can also be removed by reaction of the polymer with paratoluene sulfonic acid, trifluoroacetic acid, or trimethylsilyliodide. Additional methods of deprotection of the tert-alkyl protecting groups can be found in T. W. Greene and P. G. M. Wuts, Protective Groups in Organic Synthesis, Second Edition, Wiley, N.Y., 1991, page 41.

The tert-butyldimethylsilyl protecting groups can be removed by treatment of the polymer with acid, such as hydrochloric acid, acetic acid, paratoluene sulfonic acid, or Dowex® 50W-X8. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, N.Y., 1991, pages 80–83.

In addition, protecting groups can be selectively removed from the polymers, i.e., deprotecting conditions can be selected so as to remove at least one protecting group without removing other dissimilar protecting groups by proper selection of deprotecting reagents and conditions.

The following table details representative experimental conditions capable of selectively removing protecting groups (more labile) while maintaining the integrity of other different protecting groups (more stable).

| Labile | Stable | Conditions |
| --- | --- | --- |
| t-butyldimethylsilyl | t-butyl | tetrabutylammonium fluoride |
| t-butyldimethylsilyl | t-butyl | 1 N HCL |
| trimethylsilyl | t-butyl | tetrabutylammonium fluoride |
| trimethylsilyl | t-butyl | 1 N HCl |

The progress of the deprotection reactions can be monitored by conventional analytical techniques, such as Thin Layer Chromatography (TLC), Nuclear Magnetic Resonance (NMR), or InfraRed (IR) spectroscopy.

The polymer optionally can be hydrogenated after functionalization, before or after deprotection, or before or after copolymerization. Examples of methods to hydrogenate the polymers of this invention are described in U.S. Pat. Nos. 4,970,254, 5,166,277, 5,393,843 and 5,496,898. The hydrogenation of the polymer is conducted in situ, or in a suitable solvent, such as hexane, cyclohexane or heptane. This solution is contacted with hydrogen gas in the presence of a catalyst, such as a nickel catalyst. The hydrogenation is typically performed at temperatures from 25° C. to 150° C., with a archetypal hydrogen pressure of 15 psig to 1000 psig. The progress of this hydrogenation can be monitored by InfraRed (IR) spectroscopy or Nuclear Magnetic Resonance (NMR) spectroscopy. The hydrogenation reaction is preferably conducted until at least 90% of the aliphatic unsaturation has been saturated. The hydrogenated polymer is then recovered by conventional procedures, such as removal of the catalyst with aqueous acid wash, followed by solvent removal or precipitation of the polymer.

The invention can also provide multi-branched or star-shaped polymers which include alkenylsubstituted aromatic- and conjugated diene-based compounds, including multi-branched or star-shaped polymers with protected functional groups, their optionally hydrogenated analogues, and the polymers produced by removal of the protecting groups. The star polymers in this aspect of the invention can be produced using the functional initiators (II) described above (singly or combinations thereof), which, by design, incorporate the versatility of functional branch end star polymers. For example, hydroxy-terminated functional branches can be copolymerized with comonomers, such as organic diacids (such as carboxylic acids), diisocyanates, and the like. The polymers can also include non-functional branches in the polymer. This can provide improved impact resistance in molecules resulting from further copolymerization of the star-shaped polymers of the invention with other functional comonomers, for example, resultant polyester and/or polyamide molecules.

Novel multi-branched or star-shaped polymers having functional ends can be produced by polymerizing conjugated diene hydrocarbons and alkenylsubstituted aromatic hydrocarbons, singly, or as mixtures thereof, or sequentially as described above, with protected functional organolithium initiators of Formula (II) (singly or as combinations thereof to provide arms having different protecting groups and/or different functional groups), and subsequently reacting the resulting polymer with multifunctional linking agents. This can lead to polymer arm chain lengths of approximately the same size.

Examples of useful linking or coupling agents include halosilanes, such as silicon tetrachloride and methyl trichlorosilane; halostannanes, such as tin tetrachloride; phosphorus halides, such as phosphorus trichloride; and isomeric (mixtures of ortho, meta and para) dialkenylaryls and isomeric di- and trivinylaryls, such as 1,2-divinylbenzene, 1,3-divinylbenzene, 1,4-divinylbenzene, 1,2,4-trivinylbenzenes, 1,3-divinylnaphthalenes, 1,8-divinylnaphthalene, 1,2-diisopropenylbenzene, 1,3-diisopropenylbenzene, 1,4-diisopropenylbenzene, 1,3,5-trivinylnaphthalene, α, α', α"-tribromo-mesitylene and other suitable materials known in the art to be useful for coupling polymers, as well as mixtures of coupling agents. See also U.S. Pat. Nos. 3,639,517 and 5,489,649, and R. P. Zelinski et al in J.Polym.Sci., A3, 93, (1965) for these and additional coupling agents. This linking process is described, for example, in U.S. Pat. No. 4,409,357 and by L. J. Fetters in Macromolecules, 9,732 (1976). Mixtures of coupling agents can also be used. Generally, the amount of coupling agent used is such that the molar ratio of protected living polymer anions to coupling agents ranges from 1:1 to 24:1.

These radiating multi-arm polymers with protected functionality on the ends of the arms may be optionally hydrogenated before or after removal of the protecting groups. The star polymers thus formed may have hydroxyl functional branch ends.

Nonfunctional initiators (such as n-butyllithium, sec-butyllithium, and tert-butyllithium) may also be mixed with the functional initiators of Formula (II) to provide non-functional branch ends as well, which can serve to modify the physical properties of these star-shaped or radiating polymers, especially after their further copolymerization with other functional monomers, such as organic diacids or organic diisocyanates.

Alternatively, novel multi-branched or star-shaped polymers possessing functional ends which may be the same or different, and/or both functional and non-functional ends, may be produced by separately polymerizing alkenylsubstituted aromatic hydrocarbons and/or conjugated diene hydrocarbons with protected functional initiators (II) and/or with non-functional organolithium initiators, subsequently mixing the resulting separately produced anions, treating the resulting mixture with multifunctional linking agents, and optionally hydrogenating before or after optionally deprotecting the functional ends of the polymer. This alternative method allows for control of the molecular weight of the arms of the star polymer (for example, different polymer arm chain lengths can be produced) and provides for a more selective control of the physical properties of the resultant polymers.

If desired, the protecting groups can be removed from the arms of the star polymer, prior to or after the optional hydrogenation of the residual unsaturation of the arms, using the techniques described above. This includes selective deprotection when dissimilarly protected functional groups are present, as detailed above.

Molecular weights of the resulting linked or coupled polymers can vary depending on the molecular weight of the polymer anion and the number of potential functional linking groups on a coupling agent. The sizes of the branches of the linked polymer can be the same or vary.

The multi-branched or star-shaped polymers of the invention can be represented generally by the formula

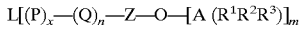

wherein L is a linking agent as described above; m is an integer from 3 to 100; x is an integer from 10 to 4000; and each P, Q, Z, A, n, $R^1$, $R^2$, and $R^3$ is as defined above.

For example, a protected functional living polymer of this invention can be generated by polymerizing 1,3-butadiene with an initiator of formula II above, wherein M is lithium, Z is a trimethylene connecting group, Q is styrene, n is 3, and $R^1$, $R^2$, and $R^3$ are methyl groups. A living polymer is produced having the formula

where B is a unit derived by polymerizing butadiene, m is an integer from about 10 to 200, and St is a unit derived by polymerization of styrene. The living polymer III, may be reacted, for example, with ethylene oxide to yield, after hydrolysis, the compound of formula

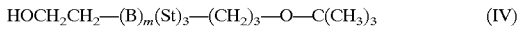

which may optionally be hydrogenated to the corresponding asymmetric polymer.

Additionally, other asymmetrically monofunctional polymers may be produced by reacting the living polymer (III) above with, for example, carbon dioxide to produce a polymer with one protected hydroxyl and one carboxyl group, or the living polymer (III) may be reacted with 1,5 diazabicyclo-(3.1.0) hexane as described in U.S. Pat. No. 4,753,991 to produce a polymer with one protected hydroxyl and one amino group. A polymer with one protected hydroxyl group and one protected amino group can be prepared by reaction of the living polymer (III) with a protected amino propyl bromide, see Macromolecules, 23, 939 (1990). Reaction of the living polymer (III) with oxetane or substituted oxetanes (see U.S. Pat. No. 5,391,637) would afford a polymer which contained one protected hydroxyl and a hydroxyl group. A polymer with two protected hydroxyl groups can be prepared by reaction of the living polymer (III) with a silicon derived acetal, see U.S. Pat. No. 5,478,899.

Other asymmetrically substituted monofunctional polymers may be produced having epoxy or isocyanate groups at one end, for example, by reacting the lithium salt of (IV) above (before hydrolysis), with epichlorohydrin or by reacting (IV) itself with an equivalent of a diisocyanate, such as methylene 4,4-diphenyl diisocyanate (2/1 NCO/OH). These unsymmetrically substituted monofunctional polymers could then be further reacted with other comonomers either with or without simultaneous deprotection as described below. Asymmetrically functional polymers with both isocyanate and hydroxyl functionality can be prepared by blocking the isocyanate functionality with materials such as caprolactam, methy ethyl ketoximes, butanol, phenol and cresol, prior to removal of the protecting group of Formula (IV). (For reference, see "Protective Coatings", Clive H. Hare, Technology Publishing Co., 1994, page 255).

The protected monohydroxy polymers (IV) alone and in their hydrogenated forms could be used as base materials to lend flexibility and higher impact strength in a number of formulas to produce coatings, sealants, binders and block copolymers with polyesters, polyamides and polycarbonates as described in UK Patent Application GB2270317A and in "Polytail" data sheets and brochures (Mitsubishi Kasei America).

In the presence of acidic catalysts used to promote the formation of many of these block copolymer resins, the protective group of the hydrogenated polymer is removed as well, allowing the exposed hydroxyl grouping in the base polymer molecule to simultaneously participate in the block copolymer reaction.

For example, hydrogenated (IV) polymers may be reacted with bisphenol A and phosgene in the presence of appropriate catalysts with simultaneous deprotection to yield a polycarbonate alternating block copolymer. The resulting products are useful as molding resins, for example, to prepare interior components for automobiles.

A segmented polyamide-hydrogenated (IV) block copolymer also useful as a molding composition to prepare exterior automotive components can be prepared by reacting hydrogenated (IV) polymer with diacid or anhydride and diamine or with a lactam (for example, caprolactam and adipic acid) in the presence of a suitable catalyst.

A segmented polyester-hydrogenated (IV) block copolymer can be produced by reaction of hydrogenated (IV) polymer with a diacid or anhydride and diol or polyol and a suitable acidic catalyst to produce polyester blocks. For example, hydrogenated polymer (IV) can be reacted with dimethyl terephthalate and a suitable acidic catalyst. At least a portion of the diacid or anhydride can be substituted by an unsaturated acid or anhydride to provide unsaturated polyester blocks capable of crosslinking with unsaturated monomers by addition of free radical initiators. Again, the products are useful as molding compounds for exterior automotive components.

Isocyanate-terminated prepolymers can be produced from hydrogenated (IV) polymers by reaction with suitable diisocyanates (2/1 NCO/OH) as above and can be further reacted with diols and additional diisocyanates to form segmented polyurethanes useful for water based, low VOC coatings. For use in water-based, self-curing formulations, the isocyanate functionality may be blocked as described previously. Inclusion of acid functional diols, such as dimethylolpropionic acid, in the polyurethane introduces acid group functionalities (pendant carboxyl groups) which can be neutralized with tertiary amines to afford water dispersible polyolefin/polyurethane segmented polymers, useful for water-based coatings. This same principle could be applied to acrylic polymers made to include tertiary amine functional monomers. Such polymers could be made by reacting the hydroxyl groups at the terminal ends of the polymer with acryloyl chloride or methacryloyl chloride followed by free radical polymerization to yield the corresponding acrylic functional macromonomer. Segmented polyurethane prepolymers may be mixed with tackifying resins and used as a moisture-curable sealant, caulk or coating.

Another possible application in coatings would be the use of new dendrimers, based on the use of the polymer with hydroxyl functionality at the termini thereof to form the core for dendritic hybrid macromolecules based on condensation or addition polymerizations, utilizing the hydroxyl functionality as the initiating site (see, for example Gitsov and Frechet, American Chemical Society PMSE Preprints, Volume 73, August 1995.

Yet another application includes use as toughening polymers for epoxy composites, utilizing the polymer core with the hydroxyl groups converted to half esters with free carboxyl functionality at the terminus thereof by reaction with anhydrides. The carboxyl functional terminal groups can be further reacted with epoxy resins and amine curing agents to form epoxy resin composites. Reacting the hydroxyl functional polymers into unsaturated polyesters provides a new polymer toughening system for polyester molding compounds for automotive and other uses. For a review of the use of linear polymers for toughening of epoxies and polyesters, see "Rubber-Toughened Plastics", Edited By C. Keith Riew, ACS Advances in Chemistry Series, #222.

Cathodic electrodepositable coatings may be prepared from epoxy functional polymers described above by reacting carboxyl functional groups with epoxy resins in the presence of excess amine or polyamine to completely react all the epoxy groups, distilling off excess amine, and neutralizing the resulting epoxy-amine adduct with water soluble organic or inorganic acids to form water soluble, quaternary ammonium containing polymer salts (see for reference, U.S. Pat. Nos. 3,617,458, 3,619,398, 3,682,814, 3,891,527, 3,947,348, and 4,093,594). Alternatively, the above epoxy-amine polymer adducts may be converted to quaternary phosphonium or sulfonium ion containing polymers, as described in U.S. Pat. No. 3,935,087.

An acrylate-terminated prepolymer curable by free-radical processes can be prepared from the hydrogenated (IV) polymer by reaction with a diisocyanate (2NCO/OH) followed by further reaction with hydroxyethyl acrylate in the presence of a basic reagent.

Another likely application for acrylate or methacrylate terminated polymers include use as viscosity index (V.I.) improvers. Using carboxyl functional monomers, such as acrylic acid and methacrylic acid, and/or amine functional monomers such as acrylamide, along with free radical initiators in further polymerizations, can result in the formation of polymer segments at the periphery of each termini with amine or other functionalities which, in addition to the advantageous properties of the polymers as V.I. improvers, combines the ability to add functionality to the polymers for dispersant properties (see, for example, U.S. Pat. Nos. 5,496,898, 4,575,530, 4,486,573, 5,290,874, 5,290,868, 4,246,374 and 5,272,211).

The versatility of the hydroxyl functional polymers of this invention, and the wide range of different segmented polymers (polyethers, polyesters, polyamides, polycarbonates, polyurethanes, etc.) which can be initiated at the hydroxyl groups, leads to numerous possible applications as compatibilizers for polymer blends and alloys. In addition to the use of such blends for new applications, much recent interest is generated in the use of compatibilizers to facilitate polymer waste recycling.

The polar functional groups of the polymer chain ends allow the polymers of this invention to alter the surface properties of polymers like polyethylene (including high density polyethylene, low density polyethylene and linear low density polyethylene), polypropylene, polyisobutylene and copolymers and blends thereof. When the polymers of this invention are blended with non-polar polyolefins, the polar functional groups on the chain ends, being incompatible with the non-polar polyolefin, will phase separate and migrate to the surface of the polyolefin. The functional polymers of the invention can be added in amounts ranging from 1 to 25% by weight based on the weight of the polyolefin. Properties such as surface adhesion are thus greatly enhanced, leading to improved adhesion of pigments in printing inks for labels, composite layering, and other adhesive applications. An alternative approach to modification of polymer surfaces to alter properties by introduction of functional groups has been the use of chemical reagents such as alkyllithiums (see, for example, A. J. Dias, K-W Lee, and T. J. McCarthy, Rubber & Plastics News, 18–20, Oct. 31, 1988, and A. J. Dias and T. J. McCarthy, Macromolecules, 20, 1437 (1987).

Alternatively, the protected monohydroxy terminated polymer (IV) may be reacted with functional comonomers, without simultaneously removing the protective group, to produce novel polymers. These polymers then may be deprotected and then further reacted with the same or different comonomers to form yet other novel polymers. Thus, for example, the hydroxyterminated polymer of formula (IV) may be hydrogenated, and then reacted with ethylene oxide in the presence of potassium tert-butoxide to produce a poly(ethylene oxide)-hydrogenated polybutadiene copolymer with one protected hydroxyl group on the polybutadiene segment. This hydroxyl can then be deprotected and a poly(ethylene oxide) polymer having different chain lengths grown onto both ends of the polybutadiene segment. These can be useful as components of hydrogels.

These processes can be applied to the deprotected and optionally hydrogenated polymers of formula (IV), as well. Thus, alternatively, the protective group could be removed first from the hydrogenated polymer, and then the block copolymers formed by addition of the appropriate comonomers.

In another possible application, the living polymer (III) may be reacted with an alkenylarylhalosilane such as styrenyldimethylchlorosilane to yield the corresponding omega-styrenylterminated macromonomer according to directions in U.S. Pat. No. 5,278,244, which may then be further polymerized by a variety of techniques to yield "comb" polymers which upon deprotection and hydrogenation yield branched polymers with hydroxyfunctionality on the branch-ends. Such multi-functionality can be utilized to graft a water-soluble polymer such as polyethylene oxide onto a hydrophobic polyolefinic core to produce hydrogels.

In still another example, a living polymer analogous to (III) having the formula

Li(B)$_x$(S)$_y$(St)$_3$(CH$_2$)$_3$—OC(CH$_3$)$_3$ where B is polymerized butadiene, S is polymerized styrene and x and y can vary from 10 to 1000 or more is reacted with divinylbenzene (DVB) to produce a multi-armed star polymer, according to U.S. Pat. No. 4,409,357 which on hydrogenation and deprotection would yield a star polymer with hydroxy-terminated branches. These hydroxy groups may also be further reacted with ethylene oxide and potassium alkoxide as described above to produce hydrogels.

In still another possible application, the hydrogenated hydroxyterminated branches of the polymer may be further reacted with acryloyl chloride or methacryloyl chloride, and the resultant acrylate or methacrylate-terminated polymer further polymerized with monomers selected from the group of alkyl acrylates, alkyl methacrylates, and dialkylacrylamides to produce hydrogels. The acrylic acid monomers can be functional or amide functional acrylic monomers to provide polar hydrophilic polymer segments. In addition, sulfonated styrene and/or 4-vinyl pyridine can be polymerized by free radical initiators onto the terminal alkenyl groups to provide functional polymer segments capable of improving dispersability of the polymer.

Star polymers are useful as viscosity index improver for motor oils.

Other monomers may be reacted directly with formula (III) type monofunctional compounds to yield block or star polymers.

The following examples further illustrate the invention.

EXAMPLE 1

Preparation of 3-(1,1-Dimethylethoxy)-1-propyllithium Chain Extended with 2 Moles of Isoprene A 500 ml, three-necked Morton flask was equipped with a mechanical stirrer, a 125 ml pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 5.00 grams (0.720 mole, 2.80 equivalents) was transferred to the flask with 250 ml cyclohexane. This suspension was stirred at 450 RPMs, and heated to 63° C. with a heating mantle. The heat source was removed. 3-Chloro-1-(1,1-dimethylethoxy)propane, 38.73 grams (0.257 mole, 1.00 equivalent) was added dropwise. An exotherm was detected after 16% of the feed had been added. A dry ice/hexane cooling bath was applied to maintain the reaction temperature at 60–65° C. The total feed time was sixty five minutes. An exotherm was noted until the last drop of feed was added, then the temperature fell off rapidly to room temperature. The reaction mixture was stirred at room temperature for forty minutes, then heated to 55° C. with a heating mantle. The heat source was removed. Isoprene, 35.05 grams (0.515 mole, 2.00 equivalents) was then added dropwise. An exotherm was noted after 34% of the feed had been added. Hexane cooling was applied to maintain the reaction temperature at 50–55° C. The total isoprene feed time was forty two minutes. The reaction mixture was allowed to stir at room temperature for one hour, then transferred to a small pressure filter with argon pressure. Very rapid filtration was observed with 2 psi argon. The muds were reslurried with cyclohexane (2×50 ml). This afforded a pale yellow, clear solution, yield=480 ml, 381.50 grams. Total base=16.4 wt. %.; Active C—Li= 15.7 wt %.; Yield (based on active C—Li)=90.3%.

An 85.22 gram sample of the 3-(1,1-dimethylethoxy)-1-propyllithium, chain extended with 2 moles of isoprene, Lot 8976, (total base=16.4 %, Active C—Li=15.7%), was transferred to a dry 250 ml round bottom flask. This solution was concentrated in a rotary evaporator. This afforded a slightly viscous, clear, orange oil, yield=24.99 grams. Total base= 56.3 wt %; Active C—Li=53.6 wt %.

Comparative Example
Preparation of 3-(1,1-Dimethylethoxy)-1-propyllithium

A 500 ml, three-necked Morton flask was equipped with a mechanical stirrer, a 125 ml, pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 4.07 grams (0.586 mole, 2.80 equivalents) was transferred to the flask with 150 ml cyclohexane. This suspension was stirred at 450 RPMs, and heated to 70° C. with a heating mantle. The heat source was removed. 3-Chloro-1-(1,1-dimethylethoxy)propane, 31.52 grams (0.209 mole, 1.00 equivalent) was added dropwise. An exotherm was detected after 5.5% of the feed had been added. A dry ice/hexane cooling bath was applied to maintain the reaction temperature at 60–65° C. The total feed time was fifty-two minutes. An exotherm was noted until the last drop of feed was added, then the temperature fell off rapidly to room temperature. The reaction mixture was allowed to stir at room temperature for three and a half hours, then transferred to a small pressure filter with argon pressure. Very rapid filtration was observed with 2 psi argon. The muds were reslurried with cyclohexane (2×50 ml). This afforded a pale yellow, hazy solution, yield=230 ml, 185.03 grams. Total base=3.85 wt. %; Active C—Li=3.78 wt %; Yield (based on active C—Li)=27.4%.

A one milliliter aliquot of this solution was withdrawn, cooled to 0° C., and carefully quenched with water. The organic layer was then analyzed by gas chromatography. A Perkin Elmer Autosystem CC, equipped with a 30 meter, 0.53 mm AT-1 column, was employed for this analysis. All the 3-chloro-1-(1,1-dimethylethoxy)propane had been consumed, with the formation of a single, lower boiling compound, identified as 1-(1,1-dimethylethoxy)propane.

This comparison example is a repeat of Example 1 except that no isoprene was added to the reaction. The product of Example 1 was more soluble in cyclohexane then was the product of the comparison example to which no isoprene was added. It is surprising that the active carbon-lithium of Example 1 was 15.7 weight percent while the comparison was only 3.78 weight percent.

EXAMPLE 2
Preparation of 3-(1,1-Dimethylethoxy)-2,2-dimethyl-1-propyllithium Chain Extended with 2 Moles of Isoprene A 500 ml, three-necked Morton flask was equipped with a mechanical stirrer, a 125 ml pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 5.10 grams (0.735 mole, 2.80 equivalents) was transferred to the flask with 250 ml cyclohexane. This suspension was stirred at 450 RPMs, and heated to 65° C. with a heating mantle. The heat source was removed. 3-Chloro-2,2-dimethyl-1-(1,1-dimethylethoxy)propane, 45.44 grams (0.254 mole, 1.00 equivalent) was added dropwise. An exotherm was detected after 10.7% of the feed had been added. A dry ice/hexane cooling bath was applied to maintain the reaction temperature at 60–65° C. The total feed time was sixty minutes. An exotherm was noted until the last drop of feed was added, then the temperature fell off rapidly to room temperature. The reaction mixture was stirred at room temperature for forty minutes, then heated to 65° C. with a heating mantle. The heat source was removed. Isoprene, 34.61 grams (0.508 mole, 2.00 equivalents) was then added dropwise. An exotherm was noted after 5.6% of the feed had been added. Hexane cooling was applied to maintain the reaction temperature at 60–65° C. The total isoprene feed time was thirty minutes. The reaction mixture was allowed to stir at room temperature for one hour, then transferred to a small pressure filter with argon pressure. Very rapid filtration was observed with 2 psi argon. The muds were reslurried with cyclohexane (2×75 ml). This afforded a yellow, clear solution, yield=480 ml, 380.84 grams. Total base=17.8 wt. %; Active C—Li= 16.9 wt %; Yield (based on active C—Li)=88.6%.

EXAMPLE 3
Preparation of 3-(t-Butyldimethylsilyloxy)-1-propyllithium Chain Extended with 2 Moles of Isoprene A 500 ml, three-necked Morton flask was equipped with a mechanical stirrer, a 125 ml pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 5.20 grams (0.749 mole, 2.80 equivalents) was transferred to the flask with 260 ml cyclohexane. This suspension was stirred at 450 RPMs, and heated to 65° C. with a heating mantle. The heat source was removed. 1-(t-Butyldimethylsilyloxy)-3-chloropropane, 58.82 grams (0.268 mole, 1.00 equivalent) was added dropwise. An exotherm was detected after 31.8% of the feed had been added. A dry ice/hexane cooling bath was applied to maintain the reaction temperature at 60–65° C. The total feed time was one hundred five minutes. An exotherm was noted until the last drop of feed was added, then the temperature fell off rapidly to room temperature. The reaction mixture was stirred at room temperature for forty five minutes, then heated to 65° C. with a heating mantle. The heat source was removed. Isoprene, 36.45 grams (0.535 mole, 2.00 equivalents) was then added dropwise. An exotherm was noted after 24.6% of the feed had been added. Hexane cooling was applied to maintain the reaction temperature at 60–65° C. The total isoprene feed time was thirty eight minutes. The reaction mixture was allowed to stir at room temperature for one hour, then transferred to a small pressure filter with argon pressure. Very rapid filtration was observed with 2 psi argon. The muds were reslurried with cyclohexane (2×50 ml). This afforded an orange solution, yield=530 ml, 425.34 grams. Total base=17.1 wt. %; Active C—Li=15.9 wt. %; Yield (based on active C—Li)=80.8%.

EXAMPLE 4
Preparation of 4-Methoxy-1-butyllithium Chain Extended with 2 Moles of Isoprene A 500 ml, three-necked Morton flask was equipped with a mechanical stirrer, a 125 ml pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×75 ml), and pentane (1×75 ml), then dried in a stream of argon. The dry dispersion, 6.30 grams (0.908 mole, 2.80 equivalents) was transferred to the flask with 250 ml cyclohexane. This suspension was stirred at 450 RPMs, and heated to 65° C. with a heating mantle. The heat source was removed. 4-Methoxy-1-chlorobutane, 39.71 grams (0.324 mole, 1.00 equivalent) was added dropwise. An exotherm was detected after 11.1% of the feed had been added. A dry ice/hexane cooling bath was applied to maintain the reaction temperature at 60–65° C. The reaction mixture turned muddy brown about halfway through the feed. The total feed time was fifty minutes. An exotherm was noted until the last drop of feed was added, then the temperature fell off rapidly to room temperature. The reaction mixture was stirred at room temperature for sixty minutes, then heated to 62° C. with a heating mantle. The heat source was removed. Isoprene, 44.16 grams (0.648 mole, 2.00 equivalents) was then added dropwise. An exotherm was noted after 7.5% of the feed had been added. Hexane cooling was applied to maintain the reaction temperature at 60–65° C. The total isoprene feed time was thirty eight minutes. The reaction mixture was allowed to stir at room temperature for one hour, then transferred to a small pressure filter with argon pressure. Very rapid filtration was observed with 2 psi argon. The muds were reslurried with cyclohexane (2×75 ml). This afforded a pale yellow, clear solution, yield=500 ml, 389.11 grams. Total base=16.2 wt. %; Active C—Li=15.5 wt %; Yield (based on active C—Li)=80.9%.

EXAMPLE 5
Polymerization of Isoprene using Initiator Prepared by Chain Extension of 3-(1,1-Dimethylethoxy)-1-propyllithium with Isoprene To a solution of 40.31 grams of isoprene dissolved in 400 ml of dry cyclohexane at 14.7° C. was added 33.39 g of a 17.3 weight per cent solution in cyclohexane of 3-(1,1-dimethylethoxy)-1-propyllithium, chain-extended with two moles of isoprene per mole of organolithium. The solution temperature rose to 15.9° C. during addition of the initiator. The solution was then heated to 51.2° C., and then the heat source withdrawn. The temperature rose on its own to 63.4° C. at which point a cooling bath was briefly applied to moderate the reaction temperature. After about one hour the temperature had dropped to 28.5° C. The reaction mixture was allowed to stand an additional 21 hours, after which it was quenched with 40 ml of anhydrous methanol. Hexane (100 ml) was added and the layers separated. The hydrocarbon layer was washed once again with 40 ml of methanol and then stripped of solvent under vacuum at 35° C. in a RotoVap unit to constant weight. A weight of 45.2 grams of a clear somewhat viscous, easily pourable oil was obtained (Theory=46.1 g)

EXAMPLE 6
Polymerization of Isoprene using Initiator Prepared by Chain Extension of 2,2-Dimethyl-3-(1,1-dimethylethoxy)-1-propyllithium with Isoprene To a solution of 40.44 grams of isoprene dissolved in 400 ml (307.5 g) of cyclohexane at 19.6° C. was added 36.06 g of a 16.9 weight percent solution in cyclohexane of 2,2-dimethyl-3-(1,1-dimethylethoxy)-1-propyllithium, chain-extended with two moles of isoprene per mole of organo-lithium. The reactants were heated to 50° C. and reaction allowed to proceed on its own. When the temperature reached 64.1° C., the reaction mixture was cooled briefly. The reaction temperature gradually dropped to 43.1° C. after 24 minutes, and to 23.2° C. after a further 2 hours. The mixture was quenched with 40 ml of methanol after standing for 14 hours. Hexane (100 ml) was added, the layers were separated and the hydrocarbon layer washed once again with 40 ml of methanol, and then solvent-stripped under vacuum at 35° C. to constant weight. A weight of 46.4 grams of a clear, somewhat viscous oily polymer was obtained (Theory=46.44 g).

EXAMPLE 7
Polymerization of Isoprene Using Initiator Prepared by Chain Extension of 4-Methoxy-1-butyllithium with Isoprene To a solution of 40.11 grams of isoprene dissolved in 400 ml of cyclohexane was added 31.50 gram of a 15.5 weight percent solution of 4-methoxy-1-butyllithium chain-extended with two moles of isoprene per mole of organolithium, in cyclohexane, at 20.8° C. The solution was heated to 53.6° C., where the reaction mixture continued to generate heat on its own, the temperature of the mass rising to 63.5° C. within 4 minutes. A cooling bath was applied for a few minutes, and the reaction then allowed to proceed on its own. After about another two hours, the reaction temperature had dropped to 22° C. After standing overnight, the orange solution was quenched with 40 ml of methanol and 100 ml hexane. The hydrocarbon layer was separated and washed with another 40 ml of methanol, then stripped of solvent under vacuum. A weight of 45.8 grams of bright yellow fluid polymer was obtained.

EXAMPLE 8
Polymerization of Isoprene using Initiator Prepared by Chain Extension of 3-(t-Butyldimethylsilyloxy)-1-propyllithium with Isoprene To a solution of 40.09 grams of isoprene dissolved in 400 ml of dry cyclohexane was added 40.55 grams of a 15.9 weight percent solution of 3-(t-butyldimethylsilyloxy)-1-propyllithium chain-extended with two moles of isoprene per mole of organolithium in cyclohexane. The solution was stirred and heated to 51.3° C., at which point the temperature continued to rise on its own, reaching 68.1° C. before a cooling bath was applied. After about 2 hours, the reactants had cooled to 22.4° C. and the reaction mixture was allowed to stand overnight. 100 ml of hexane and 40 ml of methanol were added and the mixture stirred for one hour. The hydrocarbon layer was separated, washed again with 40 ml of methanol, and stripped of solvent under vacuum. A weight of 48.2 grams of liquid polymer was recovered.

EXAMPLE 9
Polymerization of Butadiene Using Initiator Prepared by Chain Extension of 3-(1,1-Dimethylethoxy)-1-Propyllithium with Isoprene To a solution of 42.0 grams of butadiene dissolved in 312 grams of cyclohexane at 3.3° C. was added 3.82 grams of a 17.3 weight percent solution in cyclohexane of 3-(dimethylethoxy))-1-propyllithium chain-extended with two moles of isoprene per mole of organolithium. The mixture was heated to 35.4° C. at which point refluxing of the butadiene was noted. The reaction proceeded slowly, the temperature gradually rising to 40° C. at which point the heat was cut off. The temperature gradually rose on its own to 43° C., then was heated still further to 52.3° C. (total heating time was about 1.5 hours). After standing for 16 hours at room temperature the mixture was treated with 100 ml of hexane and 40 ml of methanol for one hour. the layers were separated and the upper hydrocarbon layer washed again with 40 ml of methanol. The hydrocarbon layer was stripped of solvent under vacuum at 35° C. to yield 43 grams of a light yellow, clear slightly viscous fluid.

EXAMPLE 10

Preparation of 3-(1,1-Dimethylethoxy)-1-propyllithium Chain Extended with Styrene A 500 ml, three-necked Morton flask is equipped with a mechanical stirrer, a 125 ml pressure-equalizing addition funnel, and a Claisen adapter fitted with a thermocouple, a reflux condenser, and an argon inlet. This apparatus is dried in an oven overnight at 125° C., assembled hot, and allowed to cool to room temperature in a stream of argon. Lithium dispersion is washed free of mineral oil with hexane (2×70 ml), and pentane (1×70 ml), then dried in a stream of argon. The dry dispersion, 5.00 grams (0.720 mole, 2.80 equivalents) is transferred to the flask with 250 ml cyclohexane. This suspension is stirred at 450 RPMs, and heated to 63° C. with a heating mantle. The heat source is removed. 3-Chloro-1-(1,1-dimethylethoxy)propane, 38.73 grams (0.257 mole, 1.00 equivalent) is added dropwise. An exotherm is detected after 16% of the feed has been added. A dry ice/hexane cooling bath is applied to maintain the reaction temperature at 60–65 ° C. The total feed time is sixty five minutes. An exotherm is noted until the last drop of feed is added, then the temperature falls off rapidly to room temperature. The reaction mixture is stirred at room temperature for forty minutes, then is heated to 55° C. with a heating mantle. The heat source is removed. Styrene, 26.77 grams (0.257 mole, 1.00 equivalent) is then added dropwise. An exotherm is noted after 30% of the feed has been added. Hexane cooling is applied to maintain the reaction temperature at 50–55° C. The total styrene feed time is forty two minutes. The reaction mixture is allowed to stir at room temperature for one hour, then is transferred to a small pressure filter with argon pressure. Very rapid filtration is observed with 2 psi argon. The muds are reslurried with cyclohexane (2×50 ml). This affords a pale yellow, clear solution, yield=480 ml, 381.50 grams. Total base=14.4 wt. %; Active C—Li=13.8 wt %; Yield (based on active C—Li)=90.6%.

Comparative Example

Preparation of 3-(1,1-Dimethylethoxy)-1-propyllithium

A 500 ml, three-necked Morton flask was equipped with a mechanical stirrer, a 125 ml pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 4.07 grams (0.586 mole, 2.80 equivalents) was transferred to the flask with 150 ml cyclohexane. This suspension was stirred at 450 RPMs, and heated to 70° C. with a heating mantle. The heat source was removed. 3-Chloro-1-(1,1-dimethylethoxy)propane, 31.52 grams (0.209 mole, 1.00 equivalent) was added dropwise. An exotherm was detected after 5.5% of the feed had been added. A dry ice/hexane cooling bath was applied to maintain the reaction temperature at 60–65° C. The total feed time was fifty-two minutes. An exotherm was noted until the last drop of feed was added, then the temperature fell off rapidly to room temperature. The reaction mixture was allowed to stir at room temperature for three and a half hours, then transferred to a small pressure filter with argon pressure. Very rapid filtration was observed with 2 psi argon. The muds were reslurried with cyclohexane (2×50 ml). This afforded a pale yellow, hazy solution, yield=230 ml, 185.03 grams. Total base=3.85 wt %; Active C—Li=3.78 wt %; Yield (based on active C—Li)=27.4%.

A one milliliter aliquot of this solution was withdrawn, cooled to 0° C., and carefully quenched with water. The organic layer was then analyzed by gas chromatography. A Perkin Elmer Autosystem CC, equipped with a 30 meter, 0.53 mm AT-1 column, was employed for this analysis. All the 3-chloro-1-(1,1-dimethylethoxy)propane had been consumed, with the formation of a single, lower boiling compound, identified as 1-(1,1-dimethylethoxy)propane.

This comparison example is a repeat of Example 10 except that no styrene was added to the reaction. The product of Example 10 was more soluble in cyclohexane then was the product of the Comparative Example to which no styrene was added. It is surprising that the active carbon-lithium of Example 10 was 13.8 weight percent while the comparison was only 3.78 weight percent, even though the molecular weight of the compound in Example 10 is almost twice that of the compound of the Comparative Example.

EXAMPLE 11

Preparation of 3-(1,1-Dimethylpropoxy)-2,2-dimethyl-1-propyllithium Chain Extended with Styrene A 500 ml, three-necked Morton flask is equipped with a mechanical stirrer, a 125 ml pressure-equalizing addition funnel, and a Claisen adapter fitted with a thermocouple, a reflux condenser, and an argon inlet. This apparatus is dried in an oven overnight at 125° C., assembled hot, and allowed to cool to room temperature in a stream of argon. Lithium dispersion is washed free of mineral oil with hexane (2×70 ml), and pentane (1×70 ml), then dried in a stream of argon. The dry dispersion, 5.10 grams (0.735 mole, 2.80 equivalents) is transferred to the flask with 250 ml cyclohexane. This suspension is stirred at 450 RPMs, and heated to 65° C. with a heating mantle. The heat source is removed. 3-Chloro-2,2-dimethyl-1-(1,1-dimethylpropoxy)propane, 48.91 grams (0.254 mole, 1.00 equivalent) is added dropwise. An exotherm is detected after 10.7% of the feed has been added. A dry ice/hexane cooling bath is applied to maintain the reaction temperature at 60–65° C. The total feed time is sixty minutes. An exotherm is noted until the last drop of feed is added, then the temperature falls off rapidly to room temperature. The reaction mixture is stirred at room temperature for forty minutes, then heated to 65° C. with a heating mantle. The heat source is removed. Styrene, 26.45 grams (0.254 mole, 1.00 equivalents) is then added dropwise. An exotherm is noted after 5.6% of the feed has been added. Hexane cooling is applied to maintain the reaction temperature at 60–65° C. The total styrene feed time is thirty minutes. The reaction mixture is allowed to stir at room temperature for one hour, then transferred to a small pressure filter with argon pressure. Very rapid filtration is observed with 2 psi argon. The muds are reslurried with cyclohexane (2×75 ml). This affords a yellow, clear solution, yield=480 ml, 380.84 grams. Total base=15.8 wt. %; Active C—Li=15.4 wt %; Yield (based on active C—Li)=86.1%.

EXAMPLE 12

Preparation of 3-(t-Butyldimethylsilyloxy)-1-propyllithium Chain Extended with Alpha-Methylstyrene A 500 ml, three-necked Morton flask is equipped with a mechanical stirrer, a 125 ml pressure-equalizing addition funnel, and a Claisen adapter fitted with a thermocouple, a reflux condenser, and an argon inlet. This apparatus is dried in an oven overnight at 125° C., assembled hot, and allowed to cool to room temperature in a stream of argon. Lithium dispersion is washed free of mineral oil with hexane (2×70 ml), and pentane (1×70 ml), then dried in a stream of argon. The dry dispersion, 5.20 grams (0.749 mole, 2.80 equivalents) is transferred to the flask with 260 ml cyclohexane. This suspension is stirred at 450 RPMs, and heated to 65° C. with a heating mantle. The heat source is removed.

1-(t-Butyldimethylsilyloxy)-3-chloro-propane, 55.82 grams (0.268 mole, 1.00 equivalent) is added dropwise. An exotherm is detected after 31.8% of the feed has been added. A dry ice/hexane cooling bath is applied to maintain the reaction temperature at 60–65° C. The total feed time is one hundred five minutes. An exotherm is noted until the last drop of feed is added, then the temperature falls off rapidly to room temperature. The reaction mixture is stirred at room temperature for forty five minutes, then heated to 65° C. with a heating mantle. The heat source is removed. Alpha-methylstyrene, 31.67 grams (0.268 mole, 1.00 equivalents) is then added dropwise. An exotherm is noted after 24.6% of the feed has been added. Hexane cooling is applied to maintain the reaction temperature at 60–65° C. The total alpha-methylstyrene feed time is thirty eight minutes. The reaction mixture is allowed to stir at room temperature for one hour, then transferred to a small pressure filter with argon pressure. Very rapid filtration is observed with 2 psi argon. The muds are reslurried with cyclohexane (2×50 ml). This affords an orange solution, yield=530 ml, 425.34 grams. Total base=16.1 wt. %; Active C—Li=15.5 wt %; Yield (based on active C—Li)=82.5%.

EXAMPLE 13
Polymerization of Isoprene using Initiator Prepared by Chain Extension of 3-(1,1-Dimethylethoxy)-1-propyllithium with Styrene To a solution of 40.31 grams of isoprene dissolved in 400 ml of dry cyclohexane at 14.7° C. is added 36.70 g of a 13.8 weight per cent solution in cyclohexane of 3-(1,1-dimethylethoxy)-1-propyllithium, chain-extended with one mole of styrene per mole of organolithium. The solution temperature rises to 15.9° C. during addition of the initiator. The solution is then heated to 51.2° C., and then the heat source is withdrawn. An exotherm is observed to 63.4° C., at which point a cooling bath is briefly applied to moderate the reaction temperature. After about one hour the temperature has dropped to 28.5° C. The reaction mixture is allowed to stand an additional 21 hours, after which it is quenched with 40 ml of anhydrous methanol. Hexane (100 ml) is added and the layers are separated. The hydrocarbon layer is washed once again with 40 ml of methanol and then the solvent is stripped under vacuum at 35° C. in a RotoVap unit to constant weight. A weight of 45.2 grams of a clear somewhat viscous, easily pourable oil is obtained (Theory= 46.1 g).

EXAMPLE 14
Polymerization of Isoprene using Initiator Prepared by Chain Extension of 2,2-Dimethyl-3-(1,1-dimethylpropoxy)-1-propyllithium with Styrene To a solution of 40.44 grams of isoprene dissolved in 400 ml (307.5 g) of cyclohexane at 19.6° C. is added 37.09 grams of a 15.4 weight percent solution in cyclohexane of 2,2-dimethyl-3-(1,1-dimethylpropoxy)-1-propyllithium, chain-extended with one mole of styrene per mole of organolithium. The reactants are heated to 50° C. and reaction is allowed to proceed on its own. When the temperature reaches 64.1° C., the reaction mixture is cooled briefly. The reaction temperature gradually drops to 43.1° C. after 24 minutes, and to 23.2° C. after a further 2 hours. The mixture is quenched with 40 ml of methanol after standing for 14 hours. Hexane (100 ml) is added, the layers are separated and the hydrocarbon layer is washed once again with 40 ml of methanol, and then the solvent is stripped under vacuum at 35° C. to constant weight. A weight of 46.4 grams of a clear, somewhat viscous oily polymer is obtained (Theory= 46.44 g).

EXAMPLE 15
Polymerization of Isoprene using Initiator Prepared by Chain Extension of 3-(t-Butyldimethylsilyloxy)-1-propyllithium with Alpha-Methylstyrene To a solution of 40.09 grams of isoprene dissolved in 400 ml of dry cyclohexane is added 39.25 grams of a 15.5 weight percent solution of 3-(t-butyldimethylsilyloxy)-1-propyllithium chain-extended with one mole of styrene per mole of organolithium in cyclohexane. The solution is stirred and heated to 51.3° C., at which point the temperature continued to rise on its own, reaching 68.1° C. before a cooling bath is applied. After about 2 hours, the reaction has cooled to 22.4° C. and the reaction mixture is allowed to stand overnight. Hexane (100 ml) and 40 ml of methanol are added and the mixture is stirred for one hour. The hydrocarbon layer is separated, washed again with 40 ml of methanol, and the solvent is stripped of solvent under vacuum. A weight of 48.2 grams of liquid polymer is recovered.

EXAMPLE 16
Polymerization of Butadiene Using Initiator Prepared by Chain Extension of 3-(1,1-Dimethylethoxy)-1-Propyllithium with Styrene To a solution of 42.0 grams of butadiene dissolved in 312 grams of cyclohexane at 3.3° C. is added 4.19 grams of a 13.8 weight percent solution in cyclohexane of 3-(dimethylethoxy)-1-propyllithium chain-extended with one mole of styrene per mole of organolithium. The mixture is heated to 35.4° C. at which point refluxing of the butadiene is noted. The reaction proceeded slowly, the temperature gradually rising to 40° C., at which point the heat is cut off. The temperature gradually rises on its own to 43° C., then is heated still further to 52.3° C. (total heating time is about 1.5 hours). After standing for 16 hours at room temperature, the mixture is treated with 100 ml of hexane and 40 ml of methanol for one hour. The layers are separated and the upper hydrocarbon layer is washed again with 40 ml of methanol. The hydrocarbon layer is stripped of solvent under vacuum at 35° C. to yield 43.0 grams of a light yellow, clear, slightly viscous fluid.

The foregoing examples are illustrative of the present invention and are not to be construed as limiting thereof. The invention is defined by the following claims, with equivalents of the claims to be included therein.

That which is claimed is:

1. A polymer having the formula:

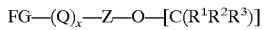

FG—(Q)$_x$—Z—O—[C(R$^1$R$^2$R$^3$)]

wherein:
FG is a protected or non-protected functional group;
Q is a saturated or unsaturated hydrocarbyl group derived by incorporation of a compound selected from the group consisting of conjugated diene hydrocarbons, alkenylsubstituted aromatic compounds, and mixtures thereof;
x is an integer from 10 to 4000;
Z is a branched or straight chain hydrocarbon group which contains 3–25 carbon atoms, optionally containing aryl or substituted aryl groups;
[C(R$^1$R$^2$R$^3$)] is a protecting group in which R$^1$, R$^2$, and R$^3$ are independently selected from hydrogen, alky, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl groups containing 5 to 12 carbon atoms.

2. The polymer of claim 1, wherein Q is an unsaturated hydrocarbyl group, FG is carboxyl and [C(R$^1$R$^2$R$^3$)] is tert-butyl.

3. The polymer of claim 1, wherein Q is an unsaturated hydrocarbyl group, FG is hydroxyl and [C(R$^1$R$^2$R$^3$)] is tert-butyl.

4. The polymer of claim 1, wherein Q is an unsaturated hydrocarbyl group, FG is amine, and [C(R$^1$R$^2$R$^3$)] is tert-butyl.

5. The polymer of claim 1, wherein Q is an unsaturated hydrocarbyl group, FG is epoxy, and [C(R$^1$R$^2$R$^3$)] is tert-butyl.

6. The polymer of claim 1, wherein Q is an unsaturated hydrocarbyl group, FG is isocyanate, and [C(R$^1$R$^2$R$^3$)] is tert-butyl.

7. A hydrogenated polymer having the formula:

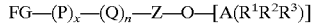

$$FG-(P)_x-(Q)_n-Z-O-[A(R^1R^2R^3)]$$

wherein:

FG is a protected or non-protected functional group;

P is a saturated hydrocarbyl group derived by incorporation of a compound selected from the group consisting of conjugated diene hydrocarbons, alkenylsubstituted aromatic compounds, and mixtures thereof;

x is an integer from 10 to 4000;

Q is a saturated hydrocarbyl group derived by incorporation of a compound selected from the group consisting of conjugated diene hydrocarbons, alkenylsubstituted aromatic compounds and mixtures thereof;

n is an integer from 1 to 5; with the proviso that P and Q are not both diene homopolymer segments comprising the same diene hydrocarbon units or P and Q are not both alkenylsubstituted aromatic compound homopolymer segments comprising the same alkenylsubstituted aromatic compound units, Z is a branched or straight chain hydrocarbon group which contains 3–25 carbon atoms, optionally containing aryl or substituted aryl groups;

[A(R$^1$R$^2$R$^3$)] is a protecting group in which A is an element selected from Group IVa of the Periodic Table of Elements; and R$^1$, R$^2$, and R$^3$ are independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl groups containing 5 to 12 carbon atoms.

8. The polymer of claim 7, wherein FG is carboxyl and [A(R$^1$R$^2$R$^3$)] is tert-butyl.

9. The polymer of claim 7, wherein FG is hydroxyl and [A(R$^1$R$^2$R$^3$)] is tert-butyl.

10. The polymer of claim 7, wherein FG is amine, and [A(R$^1$R$^2$R$^3$)] is tert-butyl.

11. The polymer of claim 7, wherein FG is epoxy, and [A(R$^1$R$^2$R$^3$)] is tert-butyl.

12. The polymer of claim 7, wherein FG is isocyanate, and [A(R$^1$R$^2$R$^3$)] is tert-butyl.

13. A multi-branched or star-shaped polymer of the formula

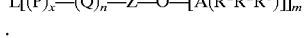

$$L[(P)_x-(Q)_n-Z-O-[A(R^1R^2R^3)]]_m$$

wherein:

L is a linking agent;

P is a saturated or unsaturated hydrocarbyl group derived by incorporation of a compound selected from the group consisting of conjugated diene hydrocarbons, alkenylsubstituted aromatic compounds, and mixtures thereof;

x is an integer from 10 to 4000;

Q is a saturated hydrocarbyl group derived by incorporation of a compound selected from the group consisting of conjugated diene hydrocarbons, alkenylsubstituted aromatic compounds and mixtures thereof;

n is an integer from 1 to 5;

with the proviso that P and Q are not both diene homopolymer segments comprising the same diene hydrocarbon units or P and Q are not both alkenylsubstituted aromatic compound homopolymer segments comprising the same alkenylsubstituted aromatic compound units, Z is a branched or straight chain hydrocarbon group which contains 3–25 carbon atoms, optionally containing aryl or substituted aryl groups;

[A(R$^1$R$^2$R$^3$)] is a protecting group in which A is selected from Group IVa of the Periodic Table of Elements; and R$^1$, R$^2$, and R$^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms; and m is an integer from 3 to 100.

14. The polymer of claim 13, wherein Q and P are saturated hydrocarbyl groups.

15. A polymer produced by polymerizing a monomer selected from the group consisting of conjugated diene hydrocarbons, alkenylsubstituted aromatic compounds, and mixtures thereof with a protected functional organometallic initiator of the formula

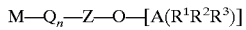

$$M-Q_n-Z-O-[A(R^1R^2R^3)]$$

wherein:

M is an alkali metal;

Q is a saturated or unsaturated hydrocarbyl group derived by incorporation of a compound selected from the group consisting of conjugated diene hydrocarbons, alkenylsubstituted aromatic compounds, and mixtures thereof;

n is an integer from 1 to 5;

Z is a branched or straight chain hydrocarbon group which contains 3–25 carbon atoms, optionally containing aryl or substituted aryl groups;

A is an element selected from Group IVa of the Periodic Table of Elements; and

R$^1$, R$^2$, and R$^3$ are each independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms, to form a mono-protected, mono-functionalized living polymer, followed by reacting said living polymer with a protected or non-protected functionalizing compound to provide a protected functionalized polymer of the formula

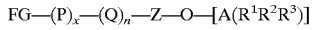

$$FG-(P)_x-(Q)_n-Z-O-[A(R^1R^2R^3)]$$

wherein FG is a protected or non-protected functional group, P is a saturated or unsaturated hydrocarbyl group derived by incorporation of a compound selected from the group consisting of conjugated diene hydrocarbons, alkenylsubstituted aromatic compounds and mixtures thereof, x is an integer from 10 to 4000, and Q, n, Z, A, $R^1$, $R^2$, and $R^3$ are the same as defined above, with the proviso that P and Q are not both diene homopolymer segments comprising the same diene hydrocarbon units or P and Q are not both alkenylsubstituted aromatic compound homopolymer segments comprising the same alkenylsubstituted aromatic compound units.

16. The polymer of claim 15, wherein said protected functionalized polymer is a saturated protected functionalized polymer produced by hydrogenating said protected functionalized polymer after said functionalizing step.

17. A multi-branched or star-shaped polymer produced by polymerizing a monomer selected from the group consisting of conjugated diene hydrocarbons, alkenylsubstituted aromatic compounds, and mixtures thereof with a protected functional organometallic initiator of the formula

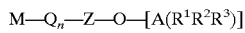

wherein:

M is an alkali metal;

Q is a saturated or unsaturated hydrocarbyl group derived by incorporation of a compound selected from the group consisting of conjugated diene hydrocarbons, alkenylsubstituted aromatic compounds, and mixtures thereof;

n is an integer from 1 to 5;

Z is a branched or straight chain hydrocarbon group which contains 3–25 carbon atoms, optionally containing aryl or substituted aryl groups;

A is an element selected from Group IVa of the Periodic Table of Elements; and $R^1$, $R^2$, and $R^3$ are each independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms, to form a mono-protected, mono-functionalized living polymer; and coupling said living polymer with at least one other living polymer with a linking agent to provide a multi-branched or star-shaped polymer of the formula

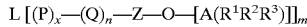

wherein L is a linking agent, m is an integer from 3 to 100, P is a saturated or unsaturated hydrocarbyl group derived by incorporation of a compound selected from the group consisting of conjugated diene hydrocarbons, alkenylsubstituted aromatic compounds and mixtures thereof, x is an integer from 10 to 4000, and Q, n, Z, A, $R^1$, $R^2$, and $R^3$ are the same as defined above, with the proviso that P and Q are not both diene homopolymer segments comprising the same diene hydrocarbon units or P and Q are not both alkenylsubstituted aromatic compound homopolymer segments comprising the same alkenylsubstituted aromatic compound units.

18. The polymer of claim 17, wherein said multi-branched or star-shaped polymer is a saturated polymer produced by hydrogenating said multi-branched or star-shaped polymer after said coupling step.

19. A polymer having the formula:

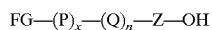

wherein:

FG is a protected or non-protected functional group;

P is an unsaturated or saturated hydrocarbyl group derived by incorporation of a compound selected from the group consisting of conjugated diene hydrocarbons, alkenylsubstituted aromatic compounds, and mixtures thereof;

x is an integer from 10 to 4000;

Q is a saturated or unsaturated hydrocarbyl group derived by incorporation of a compound selected from the group consisting of conjugated diene hydrocarbons, alkenylsubstituted aromatic compounds and mixtures thereof;

n is an integer from 1 to 5; with the proviso that P and Q are not both diene homopolymer segments comprising the same diene hydrocarbon units or P and Q are not both alkenylsubstituted aromatic compound homopolymer segments comprising the same alkenylsubstituted aromatic compound units; and Z is a branched or straight chain hydrocarbon group which contains 3–25 carbon atoms, optionally containing aryl or substituted aryl groups.

20. The polymer of claim 19, wherein FG is carboxyl.

21. The polymer of claim 19, wherein FG is hydroxyl.

22. The polymer of claim 19, wherein FG is amine.

23. The polymer of claim 19, wherein FG is epoxy.

24. The polymer of claim 19, wherein FG is a blocked isocyanate.

25. The polymer of claim 19, wherein FG is a free radically polymeriable olefinic double bond.

26. A hydrogenated polymer having the formula:

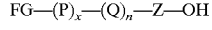

wherein:

FG is a protected or non-protected functional group;

P is a saturated hydrocarbyl group derived by incorporation of a compound selected from the group consisting of conjugated diene hydrocarbons, alkenylsubstituted aromatic compounds, and mixtures thereof;

x is an integer from 10 to 4000;

Q is a saturated hydrocarbyl group derived by incorporation of a compound selected from the group consisting of conjugated diene hydrocarbons, alkenylsubstituted aromatic compounds and mixtures thereof;

n is an integer from 1 to 5; with the proviso that P and Q are not both diene homopolymer segments comprising the same diene hydrocarbon units or P and Q are not both alkenylsubstituted aromatic compound homopolymer segments comprising the same alkenylsubstituted aromatic compound units; and Z is a branched or straight chain hydrocarbon group which contains 3–25 carbon atoms, optionally containing aryl or substituted aryl groups.

27. A multi-branched or star-shaped polymer of the formula

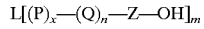

wherein:

L is a linking agent;

P is a saturated or unsaturated hydrocarbyl group derived by incorporation of a compound selected from the group consisting of conjugated diene hydrocarbons, alkenylsubstituted aromatic compounds, and mixtures thereof;

x is an integer from 10 to 4000;

Q is a saturated or unsaturated hydrocarbyl group derived by incorporation of a compound selected from the group consisting of conjugated diene hydrocarbons, alkenylsubstituted aromatic compounds and mixtures thereof;

n is an integer from 1 to 5; with the proviso that P and Q are not both diene homopolymer segments comprising the same diene hydrocarbon units or P and Q are not both alkenylsubstituted aromatic compound homopolymer segments comprising the same alkenylsubstituted aromatic compound units;

Z is a branched or straight chain hydrocarbon group which contains 3–25 carbon atoms, optionally containing aryl or substituted aryl groups; and m is an integer from 3 to 100.

28. The polymer of claim 27, wherein Q and P are saturated hydrocarbyl groups.

29. A polymer produced by polymerizing a monomer selected from the group consisting of conjugated diene hydrocarbons, alkenylsubstituted aromatic compounds, and mixtures thereof with a protected functional organometallic initiator of the formula

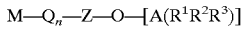
M—Q$_n$—Z—O—[A(R$^1$R$^2$R$^3$)]

wherein:

M is an alkali metal;

Q is a saturated or unsaturated hydrocarbyl group derived by incorporation of a selected from the group consisting of conjugated diene hydrocarbons, alkenylsubstituted aromatic compounds, and mixtures thereof;

n is an integer from 1 to 5;

Z is a branched or straight chain hydrocarbon group which contains 3–25 carbon atoms, optionally containing aryl or substituted aryl groups;

A is an element selected from Group IVa of the Periodic Table of Elements; and

R$^1$, R$^2$, and R$^3$ are each independently selected from hydrogen, alkyl, substituted alkyl groups containing lower alkyl, lower alkylthio, and lower dialkylamino groups, aryl substituted aryl groups containing lower alkyl, lower alkylthio, and lower dialkylamino groups, cycloalkyl and substituted cycloalkyl containing 5 to 12 carbon atoms, to form a mono-protected, mono-functionalized living polymer;

reacting said living polymer with a protected or non-protected functionalizing compound to provide an unsaturated protected functionalized polymer; and deprotecting said polymer to form a polymer of the structure

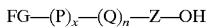
FG—(P)$_x$—(Q)$_n$—Z—OH wherein FG is a functional group, P is a saturated or unsaturated hydrocarbyl group derived by incorporation of a compound selected from the group consisting of conjugated diene hydrocarbons, alkenylsubstituted aromatic compounds and mixtures thereof, x is an integer from 10 to 4000, and Q, n, Z, A, R$^1$, R$^2$, and R$^3$ are the same as defined above, with the proviso that P and Q are not both diene homopolymer segments comprising the same diene hydrocarbon units or P and Q are not both alkenylsubstituted aromatic compound homopolymer segments comprising the same alkenylsubstituted aromatic compound units.

30. A multi-branched or star-shaped polymer produced by polymerizing a monomer selected from the group consisting of conjugated diene hydrocarbons, alkenylsubstituted aromatic compounds, and mixtures thereof with a protected functional organometallic initiator of the formula

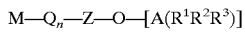
M—Q$_n$—Z—O—[A(R$^1$R$^2$R$^3$)]

wherein:

M is an alkali metal;

Q is a saturated or unsaturated hydrocarbyl group derived by incorporation of a compound selected from the group consisting of conjugated diene hydrocarbons, alkenylsubstituted aromatic compounds, and mixtures thereof;

n is an integer from 1 to 5;

Z is a branched or straight chain hydrocarbon group which contains 3–25 carbon atoms, optionally containing aryl or substituted aryl groups;

A is an element selected from Group IVa of the Periodic Table of Elements; and

R$^1$, R$^2$, and R$^3$ are each independently selected from hydrogen, alkyl, substituted alkyl groups containing lower alkyl, lower alkylthio, and lower dialkylamino groups, aryl substituted aryl groups containing lower alkyl, lower alkylthio, and lower dialkylamino groups, cycloalkyl and substituted cycloalkyl containing 5 to 12 carbon atoms, to form a mono-protected, mono-functionalized living polymer; and coupling said living polymer with at least one other living polymer with a linking agent to provide a multi-branched or star-shaped polymer; and deprotecting said polymer to form a polymer of the formula

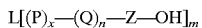
L[(P)$_x$—(Q)$_n$—Z—OH]$_m$ wherein L is a linking agent, m is an integer from 3 to 100, P is a saturated or unsaturated hydrocarbyl group derived by incorporation of a compound selected from the group consisting of conjugated diene hydrocarbons, alkenylsubstituted aromatic compounds and mixtures thereof, x is an integer from 10 to 4000, and Q, n and Z are the same as defined above, with the proviso that P and Q are not both diene homopolymer segments comprising the same diene hydrocarbon units or P and Q are not both alkenylsubstituted aromatic compound homopolymer segments comprising the same alkenylsubstituted aromatic compound units.

31. The polymer of claim 30, wherein said polymer is hydrogenated after said coupling step.

32. The polymer of claim 30, wherein said polymer is hydrogenated after said deprotecting step.

33. The polymer of any of claims 7, 13, 15, or 17, wherein P is derived by 1,4-addition of conjugated diene hydrocarbons.

34. The polymer of any of claims 7, 13, 15, or 17, wherein P is a homopolymer segment derived by incorporation a conjugated diene hydrocarbon and Q is a homopolymer segment derived by incorporation of a different diene hydrocarbon.

35. The polymer of any of claims 7, 13, 15, or 17, wherein P is a homopolymer segment derived by incorporation an alkenylsubstituted aromatic compound and Q is a homopolymer segment derived by incorporation of a different alkenylsubstituted aromatic compound.

36. The polymer of any of claims 7, 13, 15, or 17, wherein one of P and Q is a homopolymer segment derived by incorporation a conjugated diene and the other of P and Q is a homopolymer segment derived by incorporation of an alkenylsubstituted aromatic compound.

37. The polymer of any of claims 7, 13, 15, or 17, wherein P is a copolymer segment and Q is a homopolymer segment.

38. The polymer of any of claims 7, 13, 15, or 17, wherein P is a homopolymer segment and Q is a copolymer segment.

39. The polymer of any of claims 7, 13, 15, or 17, wherein each of P and Q are different copolymer segments.

40. The polymer of any of claims 19, 26, 27, 29, or 30, wherein P is derived by 1,4-addition of conjugated diene hydrocarbons.

41. The polymer of any of claims 19, 26, 27, 29, or 30, wherein P is a homopolymer segment derived by incorporation a conjugated diene hydrocarbon and Q is a homopolymer segment derived by incorporation of a different diene hydrocarbon.

42. The polymer of any of claims 19, 26, 27, 29, or 30, wherein P is a homopolymer segment derived by incorporation an alkenylsubstituted aromatic compound and Q is a homopolymer segment derived by incorporation of a different alkenylsubstituted aromatic compound.

43. The polymer of any of claims 19, 26, 27, 29, or 30, wherein one of P and Q is a homopolymer segment derived by incorporation a conjugated diene and the other of P and Q is a homopolymer segment derived by incorporation of an alkenylsubstituted aromatic compound.

44. The polymer of any of claims 19, 26, 27, 29, or 30, wherein P is a copolymer segment and Q is a homopolymer segment.

45. The polymer of any of claims 19, 26, 27, 29, or 30, wherein P is a homopolymer segment and Q is a copolymer segment.

46. The polymer of any of claims 19, 26, 27, 29, or 30, wherein each of P and Q are different copolymer segments.

47. A polymer having the formula:

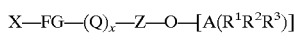

wherein:

FG is a functional group;

X is a polymer segment derived by incorporation of a monofunctional monomer or a mixture of di- or polyfunctional comonomers reacted with FG;

Q is a saturated or unsaturated hydrocarbyl group derived by incorporation of a compound selected from the group consisting of conjugated diene hydrocarbons, alkenylsubstituted aromatic compounds, and mixtures thereof;

x is an integer from 10 to 4000;

Z is a branched or straight chain hydrocarbon group which contains 3–25 carbon atoms, optionally containing aryl or substituted aryl groups;

$[A(R^1R^2R^3)]$ is a protecting group in which A is an element selected from Group IVa of the Periodic Table of Elements; and $R^1$, $R^2$, and $R^3$ are independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl groups containing 5 to 12 carbon atoms.

48. A hydrogenated polymer having the formula:

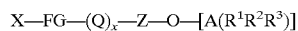

wherein:

FG is a functional group;

X is a polymer segment derived by incorporation of a monofunctional monomer or a mixture of di- or polyfunctional comonomers reacted with FG;

Q is a saturated hydrocarbyl group derived by incorporation of a compound selected from the group consisting of conjugated diene hydrocarbons, alkenylsubstituted aromatic compounds, and mixtures thereof;

x is an integer from 10 to 4000;

Z is a branched or straight chain hydrocarbon group which contains 3–25 carbon atoms, optionally containing aryl or substituted aryl groups;

$[A(R^1R^2R^3)]$ is a protecting group in which A is an element selected from Group IVa of the Periodic Table of Elements; and $R^1$, $R^2$, and $R^3$ are independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl groups containing 5 to 12 carbon atoms.

49. A multi-branched or star-shaped polymer of the formula

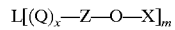

wherein:

L is a linking agent;

Q is a saturated or unsaturated hydrocarbyl group derived by incorporation of a compound selected from the group consisting of conjugated diene hydrocarbons, alkenylsubstituted aromatic compounds, and mixtures thereof;

x is an integer from 10 to 4000;

Z is a branched or straight chain hydrocarbon group which contains 3–25 carbon atoms, optionally containing aryl or substituted aryl groups;

X is a polymer segment derived by incorporation of a monofunctional monomer or a mixture of di- or polyfunctional comonomers reacted with O; and m is an integer from 3 to 100.

50. The multi-branched or star-shaped polymer of claim 49, wherein Q is a saturated hydrocarbyl group.

51. A segmented polymer produced by polymerizing a monomer selected from the group consisting of conjugated diene hydrocarbons, alkenylsubstituted aromatic compounds, and mixtures thereof with a protected functional organometallic initiator of the formula

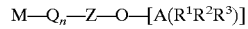

wherein:

M is an alkali metal;

Q is a saturated or unsaturated hydrocarbyl group derived by incorporation of a compound selected from the group consisting of conjugated diene hydrocarbons, alkenylsubstituted aromatic compounds, and mixtures thereof;

n is an integer from 0 to 5;

Z is a branched or straight chain hydrocarbon group which contains 3–25 carbon atoms, optionally containing aryl or substituted aryl groups;

[A(R¹R²R³)] is a protecting group in which A is an element selected from Group IVa of the Periodic Table of Elements; and R¹, R², and R³ are each independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms, to form a mono-protected, mono-functionalized living polymer;

reacting said living polymer with a protected or non-protected functionalizing compound to provide a protected functionalized polymer; and reacting said functionalized polymer with at least one monomer or mixture of comonomers under conditions sufficient to maintain the integrity of said protecting group [A(R¹R²R³)] to provide a segmented block polymer.

52. The polymer of claim 51, wherein said protected functionalized polymer is hydrogenated prior to reacting said functionalized polymer with at least one monomer or a mixture of comonomers.

53. The polymer of claim 51, wherein said segmented block polymer is hydrogenated after reacting said functionalized polymer with at least one monomer or a mixture of comonomers.

54. The polymer of claim 51, wherein said monomer or comonomer is selected from the group consisting of lactams, cyclic ethers, diisocyanates, polyisocyanates, diamides, polyamides, cyclic amides, dicarboxylic acids, polycarboxylic acids, diols, polyols, anhydrides and mixtures thereof.

55. The polymer of claim 51, wherein said functionalizing agent is a linking agent is selected from the group consisting of halosilanes, halostannanes, phosphorus halides, isomeric dialkenylaryls, isomeric divinylaryls, isomeric trivinylaryls, reactive halogen compounds, and mixtures thereof.

56. The polymer of claim 51, wherein said functionalizing compound is ethylene oxide and said comonomer comprises diisocyanate and diol to produce polyurethane blocks.

57. The polymer of claim 56, wherein said diol includes acid group functionalities, and wherein said acid group functionalities are neutralized with tertiary amines to provide dispersibility in water.

58. The polymer of claim 51, wherein said functionalizing compound is ethylene oxide and said comonomer comprises diacid or anhydride and diamine or lactam to produce polyamide blocks.

59. The polymer of claim 51, wherein said functionalizing compound is ethylene oxide and said comonomer comprises diacid or anhydride and diol or polyol to produce polyester blocks.

60. The polymer of claim 59, wherein at least a portion of said diacid or anhydride is substituted by an unsaturated acid or anhydride to provide unsaturated polyester blocks capable of crosslinking with unsaturated monomers by addition of free radical initiators.

61. The polymer of claim 51, wherein said functionalizing compound is ethylene oxide and said comonomer comprises anhydride to form a half-ester with free carboxyl functionality at the terminus of the polymer.

62. The polymer of claim 61, wherein said carboxyl functional terminal groups are further reacted with epoxy resins and amine curing agents to form epoxy resin composites.

63. The polymer of claim 51, wherein said functionalizing compound is ethylene oxide and said comonomer comprises methacryloyl chloride or acryloyl chloride to provide polymerizable alkenyl groups at the terminus of the polymer.

64. The polymer of claim 63, further comprising acrylic monomers polymerized by use of free radical initiators onto said alkenyl terminal groups.

65. The polymer of claim 64, wherein said acrylic acid monomers are functional or amide functional acrylic monomers to provide polar hydrophilic polymer segments.

66. The polymer of claim 63, wherein sulfonated styrene and/or 4-vinyl pyridine are polymerized by free radical initiators onto said terminal alkenyl groups to provide functional polymer segments capable of improving dispersability of the polymer.

67. The polymer of claim 51, wherein said functionalizing compound is ethylene oxide to form hydroxyl and wherein said hydroxyl is further reacted with sulfonyl chloride in the presence of a tertiary amine catalyst to form sulfonate functional groups at the terminus thereof.

68. The polymer of claim 67, wherein said sulfonate functional groups are reacted with primary amines or ammonia, under heat and pressure, to form polymers with amine functionality at the terminus thereof.

69. The polymer of claim 62, wherein said carboxyl functional groups are reacted with an epoxy resin and an excess of amine to completely react all of the epoxy groups, the excess amine is removed by distillation, and the resulting epoxy-amine adduct is reacted with a water soluble organic or inorganic acid to form water soluble quaternary ammonium containing polymers.

70. A hydrogenated segmented polymer produced by polymerizing a monomer selected from the group consisting of conjugated diene hydrocarbons, alkenylsubstituted aromatic compounds, and mixtures thereof with a protected functional organometallic initiator of the formula

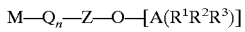

wherein:

M is an alkali metal;

Q is a saturated or unsaturated hydrocarbyl group derived by incorporation of a compound selected from the group consisting of conjugated diene hydrocarbons, alkenylsubstituted aromatic compounds, and mixtures thereof;

n is an integer from 0 to 5;

Z is a branched or straight chain hydrocarbon group which contains 3–25 carbon atoms, optionally containing aryl or substituted aryl groups;

[A(R¹R²R³)] is a protecting group in which A is an element selected from Group IVa of the Periodic Table of Elements; and R¹, R², and R³ are each independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms, to form a mono-protected, mono-functionalized living polymer;

reacting said living polymer with a protected or non-protected functionalizing compound to provide a protected functionalized polymer; and reacting said functionalized polymer with at least one monomer or a mixture of comonomers under conditions sufficient to maintain the integrity of said protecting group [A(R¹R²R³)] to provide a segmented block polymer;

wherein said protected functionalized polymer is hydrogenated prior to reacting said functionalized polymer with at least one monomer or a mixture of comonomers or said segmented block polymer is hydrogenated after reacting said functionalized polymer with at least one monomer or a mixture of comonomers.

71. A multi-branched or star-shaped polymer produced by polymerizing a monomer selected from the group consisting of conjugated diene hydrocarbons, alkenylsubstituted aromatic compounds and mixtures thereof with a protected functional organometallic initiator of the formula $$M-Q_n-Z-O-[A(R^1R^2R^3)]$$

wherein:

M is an alkali metal;

Q is a saturated or unsaturated hydrocarbyl group derived by incorporation of a compound selected from the group consisting of conjugated diene hydrocarbons, alkenylsubstituted aromatic compounds, and mixtures thereof;

n is an integer from 0 to 5;

Z is a branched or straight chain hydrocarbon group which contains 3–25 carbon atoms, optionally containing aryl or substituted aryl groups;

[A(R$^1$R$^2$R$^3$)] is a protecting group in which A is an element selected from Group IVa of the Periodic Table of Elements; and R$^1$, R$^2$, and R$^3$ are each independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms, to form a mono-protected, mono-functionalized living polymer;

coupling said living polymer with at least one other living polymer with a linking agent to provide a multi-branched or star-shaped polymer;

removing at least one protecting group [A(R$^1$R$^2$R$^3$)] to provide at least one deprotected functionalized site; and reacting said at least one deprotected functionalized site with at least one monomer or a mixture of comonomers to provide a segmented block multi-branched or star-shaped polymer.

72. The polymer of claim 71, wherein said polymer is hydrogenated after said coupling step.

73. The polymer of claim 71, wherein said polymer is hydrogenated after said removing step.

74. The polymer of claim 71, wherein said polymer is hydrogenated after said reacting step.

75. A polymer having the formula:

$$X-FG-(Q)_x-Z-OH$$

wherein:

FG is a functional group;

X is a polymer segment derived by incorporation of a monofunctional monomer or a mixture of di- or poly-functional comonomers reacted with FG;

Q is a saturated or unsaturated hydrocarbyl group derived by incorporation of a compound selected from the group consisting of conjugated diene hydrocarbons, alkenylsubstituted aromatic compounds, and mixtures thereof;

x is an integer from 10 to 4000; and

Z is a branched or straight chain hydrocarbon group which contains 3–25 carbon atoms, optionally containing aryl or substituted aryl groups.

76. A hydrogenated polymer having the formula:

$$X-FG-(Q)_x-Z-OH$$

wherein:

FG is a functional group;

X is a polymer segment derived by incorporation of a monofunctional monomer or a mixture of di- or poly-functional comonomers reacted with FG;

Q is a saturated hydrocarbyl group derived by incorporation of a compound selected from the group consisting of conjugated diene hydrocarbons, alkenylsubstituted aromatic compounds, and mixtures thereof;

x is an integer from 10 to 4000; and

Z is a branched or straight chain hydrocarbon group which contains 3–25 carbon atoms, optionally containing aryl or substituted aryl groups.

77. A segmented polymer produced by polymerizing a monomer selected from the group consisting of conjugated diene hydrocarbons, alkenylsubstituted aromatic compounds, and mixtures thereof with a protected functional organometallic initiator of the formula $$M-Q_n-Z-O-[A(R^1R^2R^3)]$$

wherein:

M is an alkali metal;

Q is a saturated or unsaturated hydrocarbyl group derived by incorporation of a compound selected from the group consisting of conjugated diene hydrocarbons, alkenylsubstituted aromatic compounds, and mixtures thereof;

n is an integer from 0 to 5;

Z is a branched or straight chain hydrocarbon group which contains 3–25 carbon atoms, optionally containing aryl or substituted aryl groups;

[A(R$^1$R$^2$R$^3$)] is a protecting group in which A is an element selected from Group IVa of the Periodic Table of Elements; and R$^1$, R$^2$, and R$^3$ are each independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms, to form a mono-protected, mono-functionalized living polymer;

reacting said living polymer with a protected or non-protected functionalizing compound to provide a protected functionalized polymer;

reacting said functionalized polymer with at least one monomer or a mixture of comonomers under conditions sufficient to maintain the integrity of said protecting group [A(R$^1$R$^2$R$^3$)] to provide a segmented block polymer; and deprotecting said segmented block polymer.

78. The polymer of claim 77, wherein said protected functionalized polymer is hydrogenated prior to the step of reacting with at least one monomer or a mixture of comonomers.

79. The polymer of claim 77, wherein said segmented block polymer is hydrogenated after the step of reacting said protected functionalized polymer with at least one monomer or a mixture of comonomers.

80. The polymer of claim 77, wherein said segmented block polymer is hydrogenated after the step of deprotecting said segmented block polymer.

81. A segmented block polymer having the formula:

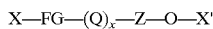

wherein:
FG is a functional group;
X is a polymer segment derived by incorporation of a monofunctional monomer or a mixture of di- or polyfunctional comonomers reacted with FG;
X' is a polymer segment derived by incorporation of a monofunctional monomer or a mixture of di- or polyfunctional comonomers reacted with O, which is the same or different as X;
Q is a saturated or unsaturated hydrocarbyl group derived by incorporation of a compound selected from the group consisting of conjugated diene hydrocarbons, alkenylsubstituted aromatic compounds, and mixtures thereof;
x is an integer from 10 to 4000; and
Z is a branched or straight chain hydrocarbon group which contains 3–25 carbon atoms, optionally containing aryl or substituted aryl groups.

82. The polymer of claim 81, wherein Q is a saturated hydrocarbyl group.

83. A hydrogenated segmented block polymer having the formula:

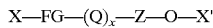

wherein:
FG is a functional group;
X is a polymer segment derived by incorporation of a monofunctional monomer or a mixture of di- or polyfunctional comonomers reacted with FG;
X' is a polymer segment derived by incorporation of a monofunctional monomer or a mixture of di- or polyfunctional comonomers reacted with O, which is the same or different as X;
Q is a saturated hydrocarbyl group derived by incorporation of a compound selected from the group consisting of conjugated diene hydrocarbons, alkenylsubstituted aromatic compounds, and mixtures thereof;
x is an integer from 10 to 4000; and
Z is a branched or straight chain hydrocarbon group which contains 3–25 carbon atoms, optionally containing aryl or substituted aryl groups.

84. The polymer of claim 81 or 83, wherein X and X' are derived from the same monomers or mixture of comonomers, and wherein Q is a saturated or unsaturated hydrocarbyl group derived by incorporation of a mixture of monomers selected from the group consisting of conjugated diene hydrocarbons and alkenylsubstituted aromatic hydrocarbons.

85. The polymer of claim 84, wherein X and X' have the same chain length.

86. The polymer of claim 84, wherein X and X' have different chain lengths.

87. The polymer of claim 81 or 83, wherein X and X' are derived from different monomers or mixture of comonomers.

88. The polymer of claim 87, wherein at least one of said X—FG and O—X' blocks comprises a polyurethane block resulting from the reaction of at least one hydroxyl functional group with diisocyanate and diol.

89. The polymer of claim 87, wherein at least one of said X—FG and O—X' blocks comprises a polyamide block resulting from the reaction of at least one hydroxyl functional group with diacid or anhydride and diamine or from a lactam.

90. The polymer of claim 87, wherein at least one of said X—FG and O—X' blocks comprises a polyester block resulting from the reaction of at least one hydroxyl functional group with diacid or anhydride and diol or polyol.

91. A segmented block polymer having the formula:

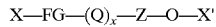

wherein:
FG is a functional group;
X is a polymer segment derived by incorporation of a monofunctional monomer or a mixture of di- or polyfunctional comonomers reacted with FG;
X' is a polymer segment derived by incorporation of a monofunctional monomer or a mixture of di- or polyfunctional comonomers reacted with O, which is different from X;
Q is a saturated or unsaturated hydrocarbyl group derived by incorporation of a compound selected from the group consisting of conjugated diene hydrocarbons, alkenylsubstituted aromatic compounds, and mixtures thereof;
x is an integer from 10 to 4000; and
Z is a branched or straight chain hydrocarbon group which contains 3–25 carbon atoms, optionally containing aryl or substituted aryl groups.

92. The polymer of claim 91, wherein Q is a saturated hydrocarbyl group.

93. A segmented block polymer having the formula:

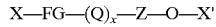

wherein:
FG is a functional group;
X is a polymer segment of a first chain length derived by incorporation of ethylene oxide reacted with FG;
X' is a polymer segment of a second chain length which is different from said first chain length derived by incorporation of ethylene oxide reacted with O;
Q is a saturated or unsaturated hydrocarbyl group derived by incorporation of a compound selected from the group consisting of conjugated diene hydrocarbons, alkenylsubstituted aromatic compounds, and mixtures thereof;
x is an integer from 10 to 4000; and
Z is a branched or straight chain hydrocarbon group which contains 3–25 carbon atoms, optionally containing aryl or substituted aryl groups.

94. The polymer of claim 93, wherein Q is a saturated hydrocarbyl group.

95. A segmented block polymer having the formula:

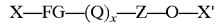

wherein:
FG is a functional group;
X is a polymer segment derived by incorporation of a monofunctional monomer or a mixture of di- or polyfunctional comonomers reacted with FG;
X' is a polymer segment derived by incorporation of a monofunctional monomer or a mixture of di- or polyfunctional comonomers reacted with O, which is different or the same as X;

Q is a saturated or unsaturated hydrocarbyl group derived by incorporation of a mixture of compounds selected from the group consisting of conjugated diene hydrocarbons and alkenylsubstituted aromatic compounds;

x is an integer from 10 to 4000; and

Z is a branched or straight chain hydrocarbon group which contains 3–25 carbon atoms, optionally containing aryl or substituted aryl groups.

96. A hydrogenated segmented block polymer having the formula:

$$X-FG-(Q)_x-Z-O-X'$$

wherein:

FG is a functional group;

X is a polymer segment derived by incorporation of a monofunctional monomer or a mixture of di- or polyfunctional comonomers reacted with FG;

X' is a polymer segment derived by incorporation of a monofunctional monomer or a mixture of di- or polyfunctional comonomers reacted with O, which is different or the same as X;

Q is a saturated hydrocarbyl group derived by incorporation of a mixture of compounds selected from the group consisting of conjugated diene hydrocarbons and alkenylsubstituted aromatic compounds;

x is an integer from 10 to 4000; and

Z is a branched or straight chain hydrocarbon group which contains 3–25 carbon atoms, optionally containing aryl or substituted aryl groups.

97. A segmented block polymer produced by polymerizing a monomer selected from the group consisting of conjugated diene hydrocarbons, alkenylsubstituted aromatic compounds, and mixtures thereof with a protected functional organometallic initiator of the formula $$M-Q_n-Z-O-[A(R^1R^2R^3)]$$

wherein:

M is an alkali metal;

Q is a saturated or unsaturated hydrocarbyl group derived by incorporation of a compound selected from the group consisting of conjugated diene hydrocarbons, alkenylsubstituted aromatic compounds, and mixtures thereof;

n is an integer from 0 to 5;

Z is a branched or straight chain hydrocarbon group which contains 3–25 carbon atoms, optionally containing aryl or substituted aryl groups;

[A(R¹R²R³)] is a protecting group in which A is an element selected from Group IVa of the Periodic Table of Elements; and R¹, R², and R³ are each independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms, to form a mono-protected, mono-functionalized living polymer;

reacting said living polymer with a protected or non-protected functionalizing compound to provide a protected functionalized polymer; and reacting said protected functionalized polymer with at least one monomer or a mixture of comonomers in the presence of a deprotecting agent to substantially simultaneously deprotect the polymer and polymerize with said at least one monomer or mixture of comonomers at each functional site to form a segmented block polymer; or reacting said functionalized polymer with at least one monomer or mixture of comonomers under conditions sufficient to maintain the integrity of said protecting group [A(R¹R²R³)] to provide a segmented block polymer; deprotecting said segmented block polymer; and reacting said deprotected segmented block polymer with a second monomer or mixture of comonomers to form a second block polymer segment.

98. The polymer of claim 97, wherein said protected functionalized polymer is hydrogenated prior to the step of reacting said protected functionalized polymer with at least one monomer or mixture of comonomers.

99. The polymer of claim 97, wherein said segmented block polymer is hydrogenated after the step of reacting said functionalized polymer with at least one monomer or mixture of comonomers in the presence of a deprotecting agent.

100. The polymer of claim 97, wherein said segmented block polymer is hydrogenated after the step of reacting said deprotected segmented block polymer with at least a second monomer or mixture of comonomers.

101. A hydrogenated segmented block polymer produced by polymerizing a monomer selected from the group consisting of conjugated diene hydrocarbons, alkenylsubstituted aromatic compounds, and mixtures thereof with a protected functional organometallic initiator of the formula $$M-Q_n-Z-O-[A(R^1R^2R^3)]$$

wherein:

M is an alkali metal;

Q is a saturated hydrocarbyl group derived by incorporation of a compound selected from the group consisting of conjugated diene hydrocarbons, alkenylsubstituted aromatic compounds, and mixtures thereof;

n is an integer from 0 to 5;

Z is a branched or straight chain hydrocarbon group which contains 3–25 carbon atoms, optionally containing aryl or substituted aryl groups;

[A(R¹R²R³)] is a protecting group in which A is an element selected from Group IVa of the Periodic Table of Elements; and R¹, R², and R³ are each independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms, to form a mono-protected, mono-functionalized living polymer;

reacting said living polymer with a protected or non-protected functionalizing compound to provide a protected functionalized polymer; and reacting said protected functionalized polymer with at least one monomer or mixture of comonomers in the presence of a deprotecting agent to substantially simultaneously deprotect the polymer and polymerize with said at least one monomer or mixture of comonomers to form a new block polymer segment at each functional site; or reacting said functionalized polymer with at least one monomer or mixture of comonomers under conditions sufficient to maintain the integrity of said protecting group [A(R¹R²R³)] to provide a segmented block polymer; deprotecting said polymer; and reacting said deprotected polymer with a second monomer or mixture of comonomers;

wherein said polymer is hydrogenated after reacting the living polymer with a functionalizing agent; or after reacting said polymer with at least one monomer or mixture of comonomers in the presence of a deprotecting agent; or after reacting said polymer with a second monomer or mixture of comonomers.

102. A process for preparing polymers, comprising:

polymerizing a monomer selected from the group consisting of conjugated diene hydrocarbons, alkenylsubstituted aromatic compounds, and mixtures thereof, with a protected functional organometallic initiator of the formula

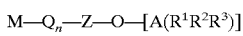

wherein:

M is an alkali metal;

Q is a saturated or unsaturated hydrocarbyl group derived by incorporation of a compound selected from the group consisting of conjugated diene hydrocarbons, alkenylsubstituted aromatic compounds, and mixtures thereof;

n is an integer from 1 to 5;

Z is a branched or straight chain hydrocarbon group which contains 3–25 carbon atoms, optionally containing aryl or substituted aryl groups;

A is an element selected from Group IVa of the Periodic Table of Elements; and $R^1$, $R^2$, and $R^3$ are each independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms; to form a mono-protected, monofunctionalized living polymer; and reacting said living polymer with a functionalizing compound to produce a protected functionalized polymer of the formula

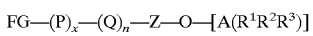

wherein FG is a protected or non-protected functional group, P is a saturated or unsaturated hydrocarbyl group derived by incorporation of a compound selected from the group consisting of conjugated diene hydrocarbons, alkenylsubstituted aromatic compounds, and mixtures thereof, x is an integer from 10 to 4000, and Q, n, Z, A, $R^1$, $R^2$, and $R^3$ are the same as defined above, with the proviso that P and Q are not both diene homopolymer segments comprising the same diene hydrocarbon units or P and Q are not both alkenylsubstituted aromatic compound homopolymer segments comprising the same alkenylsubstituted aromatic compound units.

103. The process of claim 102, wherein said polymerizing step comprises polymerizing said monomer in a liquid reaction medium at a temperature of −30° C. to 150° C.

104. The process of claim 102, further comprising hydrogenating at least a portion of aliphatic unsaturation of said protected functionalized polymer after said reacting step.

105. The process of claim 102, further comprising reacting said protected functionalized polymer with at least one monomer or mixture of comonomers in the presence of a deprotecting agent to substantially simultaneously deprotect the polymer and polymerize with said at least one monomer or mixture of comonomers to form a new polymer block segment at each functional site.

106. The process of claim 105, further comprising hydrogenating at least a portion of aliphatic unsaturation of said polymer after said reacting step.

107. The process of claim 104 or 106, wherein said hydrogenating step comprises hydrogenating at least about 90% of the aliphatic unsaturation.

108. The process of claim 102, further comprising reacting said protected functionalized polymer with a first monomer or mixture of comonomers to form a new polymer block segment.

109. The process of claim 108, further comprising deprotecting said copolymer.

110. The process of claim 109, further comprising quenching said deprotected polymer.

111. The process of claim 109, further comprising reacting said deprotected copolymer with a second monomer or mixture of comonomers to form a second new block polymer segment.

112. The process of claim 111, wherein said second monomer or mixture of comonomers is the same as the first monomer or mixture of comonomers.

113. The process of claim 111, wherein said second monomer or mixture of comonomers is different from the first monomer or mixture of comonomers.

114. The process of claim 109, further comprising hydrogenating at least a portion of aliphatic unsaturation of said polymer prior to said deprotecting step.

115. The process of claim 109, further comprising hydrogenating at least a portion of aliphatic unsaturation of said polymer after said deprotecting step.

116. The process of claim 114 or 115, wherein said hydrogenating step comprises hydrogenating at least about 90% of the aliphatic unsaturation.

117. The process of claim 102, wherein said functionalizing step comprises functionalizing said living polymer with a functionalizing compound selected from the group consisting of ethylene oxide, propylene oxide, styrene oxide, oxetane, oxygen, sulfur, carbon dioxide, chlorine, bromine, iodine, propargyl halide, chlorotrimethylsilane, styrenyldimethyl chlorosilane, 1,3-propane sultone, caprolactam, N-benzylidene trimethylsilylamide, dimethyl formamide, silicon acetals, 1,5-diazabicyclo[3.1.0]hexane, allyl bromide, allyl chloride, methacryloyl chloride, acryloyl chloride, 3-(dimethylamino)-propyl chloride, N-(benzylidene)trimethylsilylamine, epichlorohydrin, epibromohydrin, and epiiodohydrin.

118. The process of claim 102, wherein said functionalizing agent is a linking agent is selected from the group consisting of halosilanes, halostannanes, phosphorus halides, isomeric dialkenylaryls, isomeric divinylaryls, isomeric trivinylaryls, reactive halogen compounds, and mixtures thereof.

119. The process of claim 102, wherein:

said conjugated diene hydrocarbon is selected from the group consisting of 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and mixtures thereof; and said alkenylsubstituted aromatic hydrocarbon is selected from the group consisting of styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphthalene, 1,2-diphenyl-4-methyl-1-hexene, 1,1-diphenylethylene, and mixtures of these and alkyl, cycloalkyl, aryl, alkylaryl and arylalkyl derivatives thereof in which the total number of carbon atoms in the combined hydrocarbon constituents is not greater than 18, and mixtures thereof.

120. The process of claim 102, wherein A is carbon or silicon.

121. The process of claim 105, 108, or 111, wherein said monomer or mixture of comonomers is selected from the group consisting of lactams, cyclic ethers, diisocyanates, polyisocyanates, diamides, polyamides, cyclic amides, dicarboxylic acids, polycarboxylic acids, diols, polyols, anhydrides and mixtures thereof.

122. The process of claim 105, 108, or 111, wherein said functionalizing compound is ethylene oxide, and said comonomers comprise diisocyanate and diol to provide at least one polyurethane block.

123. The process of claim 105, 108, or 111, wherein said functionalizing compound is ethylene oxide, and said comonomers comprise diacid or anhydride and diamine or lactam to provide at least one polyamide block.

124. The process of claim 105, 108, or 111, wherein said functionalizing compound is ethylene oxide and said comonomers comprise diacid or anhydride and diol or polyol to provide at least one polyester block.

125. The process of claim 105, 108, or 111, wherein said functionalizing compound is ethylene oxide and said comonomers comprise anhydride to provide an half-ester with free carboxyl functionality at the terminus thereof.

126. The process of claim 125, further comprising reacting said polymer with epoxy resins and amine curing agents to form epoxy resin composites.

127. The process of claim 105, 108, or 111, wherein said functionalizing compound is ethylene oxide and said comonomer comprises methacryloyl chloride or acryloyl chloride to provide at least one polymerizable alkenyl group.

128. The process of claim 105, 108, or 111, wherein said functionalizing compound is ethylene oxide to form hydroxyl and said hydroxyl is reacted with sulfonyl chloride in the presence of a tertiary amine catalyst to provide at least one sulfonate functional group.

129. The process of claim 105, 108, or 111, wherein said functionalizing compound is ethylene oxide and said comonomers comprise ethylene oxide and the reaction is conducted in the presence of potassium tert-butoxide.

130. The process of claim 129, further comprising reacting the polymer with ethylene oxide and potassium t-butoxide to produce hydrogels.

131. The process of claim 129, further comprising reacting the polymer with methacryloyl chloride or acryloyl chloride.

132. The process of claim 131, wherein the products of the reaction are further reacted with alkyl acrylates, alkyl methacrylates, and dialkyl acrylamides to produce hydrogels.

133. A process for preparing a multi-branched or star-shaped polymer, comprising:

polymerizing a monomer selected from the group consisting of conjugated diene hydrocarbons, alkenylsubstituted aromatic compounds, and mixtures thereof with a protected functional organometallic initiator of the formula

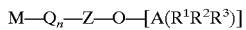

wherein:

M is an alkali metal;

Q is a saturated or unsaturated hydrocarbyl group derived by incorporation of a compound selected from the group consisting of conjugated diene hydrocarbons, alkenylsubstituted aromatic compounds, and mixtures thereof;

n is an integer from 1 to 5;

Z is a branched or straight chain hydrocarbon group which contains 3–25 carbon atoms, optionally containing aryl or substituted aryl groups;

$[A(R^1R^2R^3)]$ is a protecting group in which A is an element selected from Group IVa of the Periodic Table of Elements; and $R^1$, $R^2$, and $R^3$ are each independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms, to form a mono-protected, mono-functionalized living polymer; and coupling said living polymer with at least one other living polymer with a linking agent to provide a multi-branched or star-shaped polymer of the formula

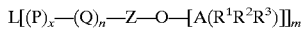

wherein L is a linking agent, m is an integer from 3 to 100, P is a saturated or unsaturated hydrocarbyl group derived by incorporation of a compound selected from the group consisting of conjugated diene hydrocarbons, alkenylsubstituted aromatic compounds and mixtures thereof, x is an integer from 10 to 4000, and Q, n, Z, A, $R^1$, $R^2$, and $R^3$ are the same as defined above, with the proviso that P and Q are not both diene homopolymer segments comprising the same diene hydrocarbon units or P and Q are not both alkenylsubstituted aromatic compound homopolymer segments comprising the same alkenylsubstituted aromatic compound units.

134. The process of claim 133, further comprising removing at least one protecting group $[A(R^1R^2R^3)]$ to provide at least one deprotected functionalized site.

135. The process of claim 134, further comprising reacting said at least one deprotected functionalized site with at least one monomer or mixture of comonomers to provide a segmented block multi-branched or star-shaped polymer.

136. The process of claim 133, further comprising hydrogenating said polymer after said coupling step.

137. The process of claim 134, further comprising hydrogenating said polymer after said deprotection step.

138. The process of claim 135, further comprising hydrogenating said polymer after said reacting step.

139. The process of claim 102 or 133, wherein said polymerization step is conducted in a hydrocarbon solvent.

140. The process of claim 102 or 133, wherein P is a homopolymer segment derived by incorporation a conjugated diene hydrocarbon and Q is a homopolymer segment derived by incorporation of a different diene hydrocarbon.

141. The process of claim 102 or 133, wherein P is a homopolymer segment derived by incorporation an alkenyl-substituted aromatic compound and Q is a homopolymer segment derived by incorporation of a different alkenylsubstituted aromatic compound.

142. The process of claim 102 or 133, wherein one of P and Q is a homopolymer segment derived by incorporation a conjugated diene and the other of P and Q is a homopolymer segment derived by incorporation of an alkenylsubstituted aromatic compound.

143. The process of claim 102 or 133, wherein P is a copolymer segment and Q is a homopolymer segment.

144. The process of claim 102 or 133, wherein P is a homopolymer segment and Q is a copolymer segment.

145. The process of claim 102 or 133, wherein each of P and Q are different copolymer segments.

146. A process for sequentially preparing segmented block polymers, comprising:

polymerizing a monomer selected from the group consisting of conjugated diene hydrocarbons, alkenylsubstituted aromatic compounds, and mixtures thereof, with a protected functional organometallic initiator of the formula

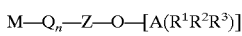

wherein:

M is an alkali metal;

Q is a saturated or unsaturated hydrocarbyl group derived by incorporation of a compound selected from the group consisting of conjugated diene hydrocarbons, alkenylsubstituted aromatic compounds, and mixtures thereof;

n is an integer from 0 to 5;

Z is a branched or straight chain hydrocarbon group which contains 3–25 carbon atoms, optionally containing aryl or substituted aryl groups;

A is an element selected from Group IVa of the Periodic Table of Elements; and $R^1$, $R^2$, and $R^3$ are each independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms; to form a mono-protected, mono-functionalized living polymer;

reacting said living polymer with a functionalizing compound to produce a protected functionalized polymer;

reacting said protected functionalized polymer with a first monomer or mixture of comonomers to form a protected functionalized segmented block copolymer;

deprotecting said protected functionalized block copolymer; and reacting said deprotected copolymer with a second monomer or mixture of comonomers.

147. The process of claim 146, further comprising hydrogenating the protected functionalized polymer prior to the step of reacting said protected functionalized polymer with a first monomer or mixture of comonomers.

148. The process of claim 146, further comprising hydrogenating said segmented block copolymer prior to the deprotecting step.

149. The process of claim 146, further comprising hydrogenating said deprotected polymer prior to reaction with said second monomer or mixture of comonomers.

150. The process of claim 146, further comprising hydrogenating said polymer after reacting with said second monomer or mixture of comonomers.

151. The process of claim 146, wherein said second monomer or mixture of comonomers is the same as said first monomer or mixture of comonomers.

152. The process of claim 146, wherein said second monomer or mixture of comonomers is different from said first comonomer or mixture of conomoners.

153. A process for preparing polymers, comprising:

polymerizing a monomer selected from the group consisting of conjugated diene hydrocarbons, alkenylsubstituted aromatic compounds, and mixtures thereof, with a protected functional organometallic initiator of the formula

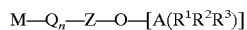

wherein:

M is an alkali metal;

Q is an unsaturated or saturated hydrocarbyl group derived by incorporation of a compound selected from the group consisting of conjugated diene hydrocarbons, alkenylsubstituted aromatic compounds, and mixtures thereof;

n is an integer from 1 to 5;

Z is a branched or straight chain hydrocarbon group which contains 3–25 carbon atoms, optionally containing aryl or substituted aryl groups;

A is an element selected from Group IVa of the Periodic Table of Elements; and $R^1$, $R^2$, and $R^3$ are each independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms; to form a mono-protected, mono-functionalized living polymer;

reacting said living polymer with a functionalizing compound to produce an unsaturated protected functionalized polymer of the formula

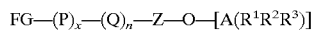

wherein FG is a protected or non-protected functional group, P is a saturated or unsaturated hydrocarbyl group derived by incorporation of a compound selected from the group consisting of conjugated diene hydrocarbons, alkenylsubstituted aromatic compounds, and mixtures thereof, x is an integer from 10 to 4000, and Q, n, Z, A, $R^1$, $R^2$, and $R^3$ are the same as defined above, with the proviso that P and Q are not both diene homopolymer segments comprising the same diene hydrocarbon units or P and Q are not both alkenylsubstituted aromatic compound homopolymer segments comprising the same alkenylsubstituted aromatic compound units;

deprotecting said unsaturated protected functionalized polymer; and hydrogenating at least a portion of the aliphatic unsaturation of said deprotected functionalized polymer.

154. The process of claim 153, wherein said hydrogenating step comprises hydrogenating at least about 90% of the aliphatic unsaturation.

155. The process of claim 153, wherein said polymerization step is conducted in a hydrocarbon solvent.

156. The process of claim 153, wherein P is a homopolymer segment derived by incorporation a conjugated diene hydrocarbon and Q is a homopolymer segment derived by incorporation of a different diene hydrocarbon.

157. The process of claim 153, wherein P is a homopolymer segment derived by incorporation an alkenylsubstituted aromatic compound and Q is a homopolymer segment derived by incorporation of a different alkenylsubstituted aromatic compound.

158. The process of claim 153, wherein one of P and Q is a homopolymer segment derived by incorporation a conjugated diene and the other of P and Q is a homopolymer segment derived by incorporation of an alkenylsubstituted aromatic compound.

159. The process of claim 153, wherein P is a copolymer segment and Q is a homopolymer segment.

160. The process of claim 153, wherein P is a homopolymer segment and Q is a copolymer segment.

161. The process of claim 153, wherein each of P and Q are different copolymer segments.

* * * * *

UNITED STATES PATENT AND TRADEMARK OFFICE
CERTIFICATE OF CORRECTION

PATENT NO. : 6,197,891 B1
DATED : March 6, 2001
INVENTOR(S) : Schwindeman et al.

Page 1 of 1

It is certified that error appears in the above-identified patent and that said Letters Patent is hereby corrected as shown below:

<u>Title page,</u>
Item [56] References Cited, FOREIGN PATENT DOCUMENTS,
Line 5, "2 241 317" should read -- 2 241 239 --.

<u>Column 10,</u>
Line 34, in the formula:

"$L[(P)_x-(Q)_n-Z-O-[A\ (R^1R^2R^3)]m$"

should read

-- $L[(P)_x-(Q)_n-Z-O-[A(R^1R^2R^3)]]m$ --.

Signed and Sealed this

Thirtieth Day of October, 2001

Attest:

NICHOLAS P. GODICI
*Attesting Officer*     *Acting Director of the United States Patent and Trademark Office*